US012477425B2

(12) United States Patent
Lei et al.

(10) Patent No.: US 12,477,425 B2
(45) Date of Patent: Nov. 18, 2025

(54) MOBILITY ENHANCEMENTS AND POWER SAVING FOR USER EQUIPMENT COMMUNICATION

(71) Applicant: QUALCOMM Incorporated, San Diego, CA (US)

(72) Inventors: Jing Lei, San Diego, CA (US); Peter Pui Lok Ang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 18/059,964

(22) Filed: Nov. 29, 2022

(65) Prior Publication Data

US 2024/0179599 A1 May 30, 2024

(51) Int. Cl.
*H04W 36/30* (2009.01)

(52) U.S. Cl.
CPC .................................. *H04W 36/30* (2013.01)

(58) Field of Classification Search
CPC ...... H04L 5/001; H04L 5/0098; H04W 24/10; H04W 36/0058; H04W 36/00837; H04W 36/085; H04W 36/087; H04W 36/30
See application file for complete search history.

(56) References Cited

U.S. PATENT DOCUMENTS

| 2010/0151860 A1 | 6/2010 | Klockar |
| 2016/0157122 A1 | 6/2016 | Zhang et al. |
| 2017/0188252 A1 | 6/2017 | Miao |
| 2019/0166555 A1* | 5/2019 | Cheng ............... H04W 36/0088 |
| 2020/0031818 A1 | 1/2020 | Duan et al. |

(Continued)

FOREIGN PATENT DOCUMENTS

| WO | 2021216901 A1 | 10/2021 |
| WO | 2022032075 A1 | 2/2022 |

OTHER PUBLICATIONS

Nokia Corporation, et al., "Summary of [77#32] LTE: HetNet Mobility: Impact of DRX on Mobility Performance", 3GPP TSG-RAN WG2 Meeting #77bis, R2-121162, 3rd Generation Partnership Project, Mobile Competence Centre, 650, Route Des Lucioles, F-06921 Sophia-Antipolis Cedex, France, vol. RAN WG2, No. Jeju, South Korea, Mar. 26, 2012-Mar. 30, 2012, Mar. 22, 2012, 5 Pages, XP050606508, Paragraph 2.2.2.

(Continued)

*Primary Examiner* — Pao Sinkantarakorn
(74) *Attorney, Agent, or Firm* — Procopio, Cory, Hargreaves & Savitch LLP

(57) ABSTRACT

Apparatuses and methods for mobility enhancements and power saving considerations for UE are described. An apparatus is configured to operate on an active DL BWP in a source node, where the active DL BWP is not a default DL BWP associated with the UE, and start a BWP inactivity timer at the UE that triggers a BWP switch from an active DL BWP to the default DL BWP after the BWP inactivity timer expires at a first expiration time. The apparatus is also configured to report a measurement of at least one of the source node or a target node, and start a mobility reception timer based on a condition associated with at least one of the measurement of the source node being below a first signal quality threshold or the measurement of the target node being above a second signal quality threshold.

28 Claims, 18 Drawing Sheets

(56) References Cited

U.S. PATENT DOCUMENTS

| | | | |
|---|---|---|---|
| 2020/0186991 A1 | 6/2020 | He et al. | |
| 2020/0187064 A1 | 6/2020 | Susitaival et al. | |
| 2020/0204333 A1 | 6/2020 | Agiwal et al. | |
| 2020/0260300 A1* | 8/2020 | Cirik | H04W 36/305 |
| 2020/0305038 A1 | 9/2020 | Tooher et al. | |
| 2020/0351729 A1* | 11/2020 | Rastegardoost | H04W 36/0072 |
| 2021/0076372 A1* | 3/2021 | Zhang | H04W 36/06 |
| 2021/0076445 A1* | 3/2021 | Tsai | H04W 76/19 |
| 2021/0344469 A1 | 11/2021 | Pezeshki et al. | |
| 2022/0029763 A1 | 1/2022 | Manolakos et al. | |
| 2022/0232436 A1 | 7/2022 | Zhu et al. | |
| 2022/0322196 A1* | 10/2022 | Xu | H04W 36/305 |
| 2024/0179554 A1 | 5/2024 | Lei | |

OTHER PUBLICATIONS

Partial International Search Report—PCT/US2023/036143—ISA/EPO—Feb. 19, 2024.

Qualcomm Incorporated: "Remaining Issues for On-demand DL-PRS", 3GPP TSG-RAN WG2 Meeting #116-e, R2-2200964, 3GPP Draft, 3rd Generation Partnership Project, Mobile Competence Centre, 650, Route Des Lucioles, F-06921 Sophia-Antipolis Cedex, France, vol. RAN WG2, No. Electronic, Jan. 17, 2022-Jan. 25, 2022, Jan. 11, 2022, pp. 1-15, XP052094078, Section 7.x.2, Figure 7.x.2-1, pp. 10-11.

Zte Corporation, et al., "Discussion on Single Connected Handover", 3GPP TSG-RAN WG2 Meeting #101, R2-1802021 (Revision of R2-1800438), 3rd Generation Partnership Project, Mobile Competence Centre, 650, Route Des Lucioles, F-06921 Sophia-Antipolis Cedex, France, vol. RAN WG2, No. Athens, Greece, Feb. 26, 2018-Mar. 2, 2018, Feb. 15, 2018, 5 Pages, XP051399791, Paragraph 2, Figures 1 and 2.

3GPP TS 38.331: "3rd Generation Partnership Project; Technical Specification Group Radio Access Network; NR; Radio Resource Control (RRC) Protocol Specification (Release 17)", 3rd Generation Partnership Project, Mobile Competence Centre, 650, Route Des Lucioles, F-06921 Sophia-Antipolis Cedex, France, vol. RAN WG2, No. V17.2.0 , Oct. 2, 2022, XP052211372, 1295 pages, pp. 1-1298, paragraph 5.2.2.4.1, paragraph 5.5.4.3, paragraph 5.5.4.5, paragraph 5.7.4.

International Search Report and Written Opinion—PCT/US2023/036143—ISA/EPO—Jun. 20, 2024.

Lenovo, et al., "UE assistance for measurement gap and SMTC configuration in NTN", 3GPP TSG-RAN WG2 Meeting #116, R2-2110310, 3rd Generation Partnership Project, Mobile Competence Centre, 650, Route Des Lucioles, F-06921, Sophia-Antipolis Cedex, FRANCE, vol. RAN WG2, No. electronic, Nov. 1, 2021-Nov. 12, 2021, Oct. 22, 2021, 3 Pages, XP052066754, paragraph 2.

\* cited by examiner

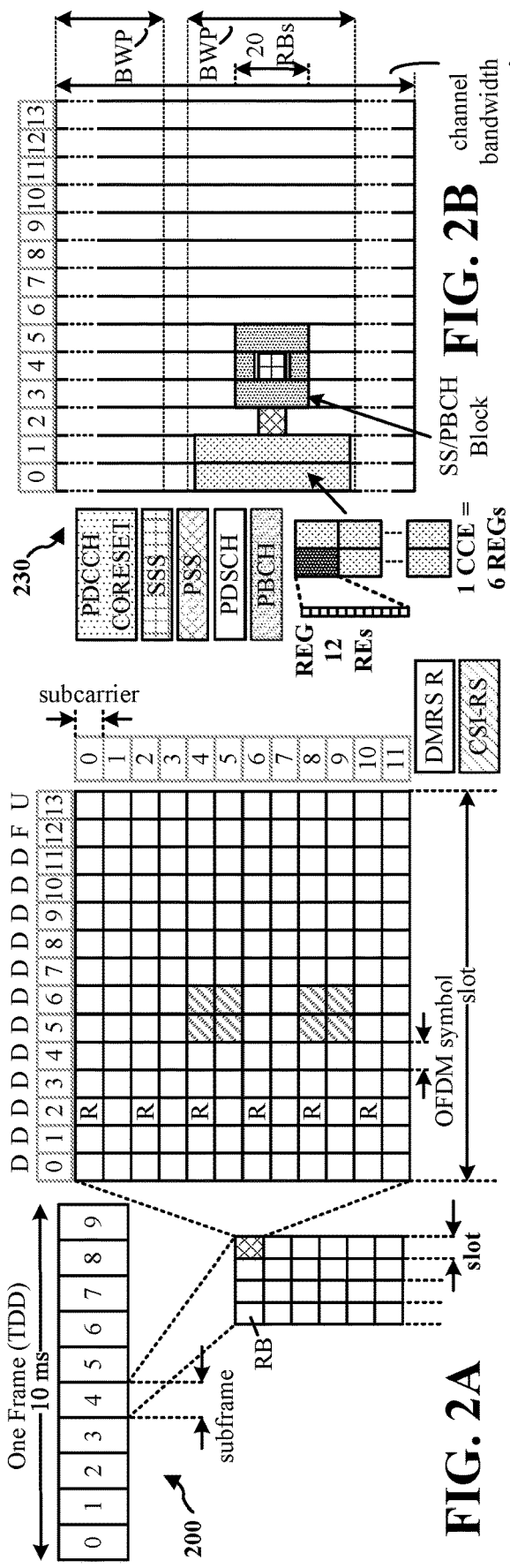
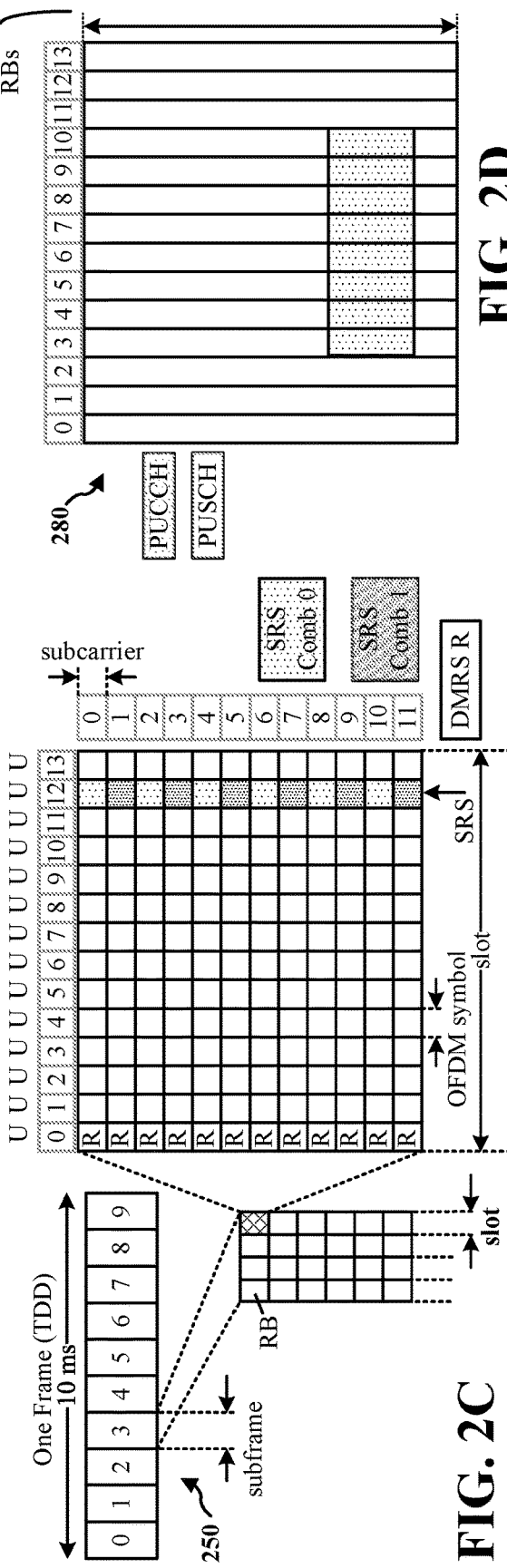
FIG. 2A
FIG. 2B
FIG. 2C
FIG. 2D

MOBILITY ENHANCEMENTS AND POWER SAVING FOR USER EQUIPMENT COMMUNICATION

TECHNICAL FIELD

The present disclosure relates generally to communication systems, and more particularly, to wireless communications that utilize user equipment mobility.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is configured to operate on an active downlink (DL) bandwidth part (BWP) in a source node, where the active DL BWP is not a default DL BWP associated with the UE. The apparatus is also configured to start a BWP inactivity timer at the UE that triggers a BWP switch from an active DL BWP to the default DL BWP after the BWP inactivity timer expires at a first expiration time. The apparatus is also configured to report a measurement of at least one of the source node or a target node. The apparatus is also configured to start a mobility reception timer based on a condition associated with at least one of the measurement of the source node being below a first signal quality threshold or the measurement of the target node being above a second signal quality threshold.

In another aspect of the disclosure, a method, a computer-readable medium, and an apparatus are provided. The apparatus is configured to perform a measurement of at least one of a source node or a target node. The apparatus is also configured to transmit UE assistance information (UAI) associated with power saving, coverage enhancement, reliability enhancement, measurements, sensing, channel sounding, a dedicated physical random access channel (PRACH) resource, and preferred configurations for a beam, a transmission reception point (TRP), or a cell in the target node based on a condition associated with at least one of a first measurement of the source node being below a first signal quality threshold or a second measurement of the target node being above a second signal quality threshold.

In another aspect of the disclosure, a method, a computer-readable medium, and an apparatus are provided. The apparatus is configured to configure, for a UE, a first configuration for an active DL BWP at the UE, a second configuration for a default DL BWP at the UE, a BWP inactivity timer, and a mobility reception timer. The apparatus is also configured to receive, from the UE, a measurement of at least one of the source node or a target node, where the measurement corresponds to the UE operating on the active DL BWP in the source node, where the BWP inactivity timer and the mobility reception timer are configured with a triggering condition associated with the measurement.

In another aspect of the disclosure, a method, a computer-readable medium, and an apparatus are provided. The apparatus is configured to configure, for a UE, a configuration to provide UAI associated with power saving, coverage enhancement, reliability enhancement, measurements, sensing, channel sounding, request for dedicated PRACH resource, and preferred configurations for a beam, a TRP, or a cell in a target node based on a condition associated with at least one of a first measurement of the source node being below a first signal quality threshold or a second measurement of the target node being above a second signal quality threshold. The apparatus is also configured to receive, from the UE, the UAI based on the configuration.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

DETAILED DESCRIPTION

Figure 1:
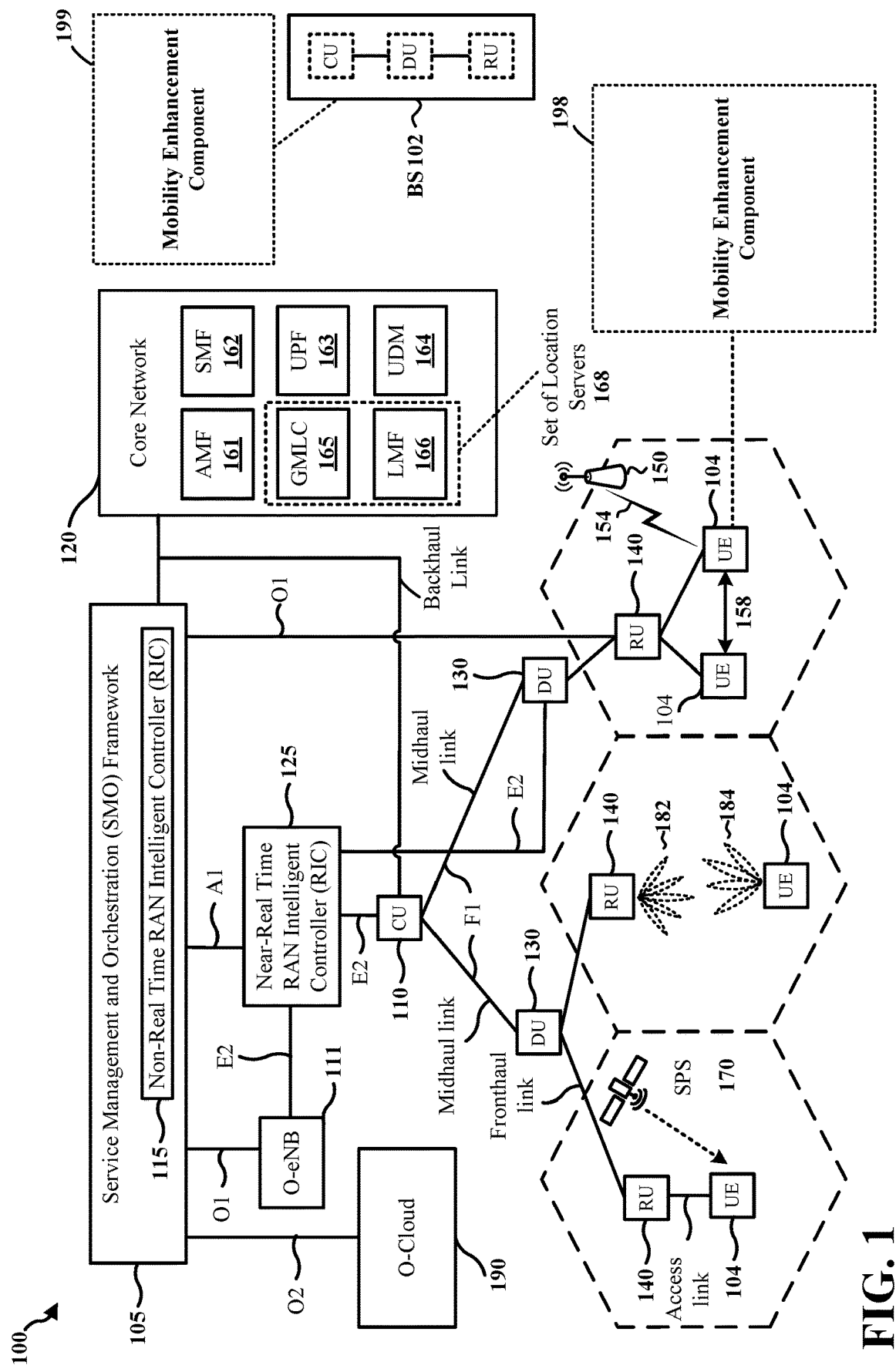
FIG. 1 is a diagram illustrating an example of a wireless communications system and an access network.

Wireless communication networks, such as a 5G NR network or an advanced mobile network that supports multiple bandwidth part configuration, may be designed to include user equipment (UE) mobility involving a change of cells, transmission reception points (TRP) or beams. A UE may receive a command(s) from a network for mobility operations, radio resource control (RRC) configuration(s), or RRC re-configuration(s) associated with conditional change of cells, transmission reception points, or beams. For example, a UE may make measurements related to a source node and a target node(s) and provide such measurements in a report to the source node which may in turn initiate or trigger cell-level mobility, TRP-level mobility, or beam-level mobility with the target node away from the source node, such as a handover (HO) operation by way of example. HO failure may occur in some cases when communications between the UE and the source node do not complete. Compounding this issue, the UE may be configured switch from operating in an active downlink (DL) bandwidth part (BWP) on the source node to a default DL BWP based on timer for inactivity in order to save power. In such configurations, mobility information such as the HO command or RRC configurations/re-configurations from the source node may arrive in the active DL BWP, while the UE has switched to the default DL BWP; the network side operations for a HO may include multiple processing steps and may require some time to complete. In such cases, the UE may miss the mobility information such as a HO command or a RRC configuration/re-configuration entirely as well as the opportunity for a network initiated HO or a network assisted conditional HO. Latency in the network-side response for mobility operations may be problematic with respect to mobility, overhead, and power saving, and with network-side densification and new spectrum opened for 5GA/6G, as well as expanded support for new devices with higher speeds, more frequent cell-level mobility/TRP-level mobility/beam-level mobility may be expected for the UE and/or the network. Aspects herein enable a UE to be configured to advantageously manipulate BWP inactivity timers (e.g., stop, pause, continue, restart, reset, etc.) and utilize mobility reception timers to allow the UE to remain in an active DL BWP in a source node for additional time to monitor DL search space sets for transmission or re-transmission of mobility information from the source node, and enable flexibility in providing UE assistance information (UAI) to a source node for mobility operations with reduced latency, overhead, and power consumption.

Various aspects relate generally to mobility enhancements and power saving considerations for user equipment. Some aspects more specifically relate to utilizing a mobility reception timer and/or an adjusted BWP inactivity, while further aspects more specifically relate to providing UAI to a source node. In some examples, a BWP inactivity timer may be paused or stopped when the mobility reception timer is started, while some examples continue running the BWP inactivity timer, and adjusting its expiration time, when starting the mobility reception timer. In other examples, UAI may be provided via valid uplink resources or via multiplexing with source/target node measurements.

Utilizing a mobility reception timer and/or an adjusted BWP inactivity timer provide a UE with additional time to monitor for mobility information after a BWP inactivity timer expires, and the UAI provides for additional mobility enhancements. With the additional monitoring time, the UE may be enabled to switch, from a first beam, a first transmission reception point (TRP), or a first cell in the source node, to a second beam, a second TRP, or a second cell in the target node, while the UE still remains enabled to switch from the active DL BWP to the default DL BWP after enough time passes. Additionally, the UE may provide UAI, for mobility enhancements, via a valid UL resource or via multiplexing with the measurement report. Thus, aspects provide for mobility enhancements, such as in connected modes, which may be applied in legacy implementations, as well as 5G, 5GA, and 6G, or be combined with solutions proposed for 5G to improve power saving, latency, and robustness of mobility at cell-levels and/or TRP-levels and/or beam-levels.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHZ), FR4 (71 GHZ-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a mobility enhancement component 198 ("component 198") that may be configured to operate on an active DL BWP in a source node, where the active DL BWP is not a default DL BWP associated with the UE. The component 198 may also be configured to start a BWP inactivity timer at the UE that triggers a BWP switch from an active DL BWP to the default DL BWP after the BWP inactivity timer expires at a first expiration time. The component 198 may also be configured to report a measurement of at least one of the source node or a target node. The component 198 may also be configured to start a mobility reception timer based on a condition associated with at least one of a first measurement of the source node being below a first signal quality threshold or a second measurement of the target node being above a second signal quality threshold. In one configuration, the component 198 may also be configured to stop or pause the BWP inactivity timer in response to starting the mobility reception timer, and: to switch, from a first beam, a first transmission reception point (TRP), or first a cell in the source node, to a second beam, a second TRP, or a second cell in the target node of the UE based on receiving mobility information from the source node prior to reaching a second expiration time associated with the mobility reception timer, or to switch from the active DL BWP in the source node to the default DL BWP in the source node that is associated with the UE based on reaching the second expiration time of the mobility reception timer and without receiving the mobility information from the source node. The component 198 may also be configured to monitor at least one search space set in the active DL BWP of the UE for DL control signaling associated with the mobility information received from the source node, while the mobility reception timer is active. The component 198 may also be configured to receive, from the source node, a configuration for at least one of the active DL BWP, the default DL BWP, the BWP inactivity timer, the first expiration time of the BWP inactivity timer, the mobility reception timer, the second expiration time of the mobility reception timer, one or more measurement objects, a transmission and resource allocation scheme for the measurement reporting, a first number of monitoring occasions for a search space set and a DL control signaling format before the mobility reception timer starts, a second number of monitoring occasions for the search space set and the DL control signaling format after the mobility reception timer starts, a scrambling sequence for the DL control signaling or mobility information, an identifier for the UE or a UE group including the UE, a transmission and resource allocation scheme for UE assistance information, the first signal quality threshold of the source node, or the second signal quality threshold of the target node. In one configuration, the component 198 may also be configured to start the mobility reception timer before the BWP inactivity timer expires at the first expiration time based at least on determining a time duration between a time of reporting the measurement and the first expiration time of the BWP inactivity timer (e.g., before the adjustment of the BWP inactivity expiration time) is lower than a pre-configured threshold for the mobility reception timer, where the BWP inactivity timer is associated with a first time window configuration for the UE to receive control and data information that is unicast or multicast to the UE, and the mobility reception timer is associated with a second time window configuration UE to receive mobility information associated with the UE or a UE group. In the configuration, the component 198 may also be configured to restart the BWP inactivity timer after starting the mobility reception timer, where the restarted BWP inactivity timer is associated with an adjusted first expiration time, and: to switch, from a first beam, a first TRP, or a first cell in the source node, to a second beam, a second TRP, or a second cell in the target node associated with the UE, based on receiving mobility information from the source node and prior to reaching a greater or a lesser of the adjusted first expiration time of the BWP inactivity timer and the second expiration time of the mobility reception timer, or to switch from the active DL BWP of the source node to the default DL BWP of the source node that is associated with the UE based on reaching the second expiration time associated with a greater or a lesser of the adjusted first expiration time of the BWP inactivity timer and the second expiration time of the mobility reception timer, and without receiving the mobility information from the source node. The component 198 may also be configured to monitor at least one search space set in the active DL BWP of the UE for DL control signaling associated with the mobility information received from the source node while the mobility reception timer is active. The component 198 may also be configured to receive, from the source node, a configuration for at least one of the active DL BWP, the default DL BWP, the BWP inactivity timer, the first expiration time, the mobility reception timer, the second expiration time, one or more measurement objects, a reporting resource, the first signal quality threshold, the second signal quality threshold, or the adjusted first expiration time. In another aspect of the disclosure, the component 198 may be configured to perform a measurement of at least one of a source node or a target node. The component 198 may also be configured to transmit UAI associated with power saving, coverage enhancement, reliability enhancement, measurements, sensing, channel sounding, a dedicated PRACH resource, and preferred configurations for a beam, a TRP, or a cell in the target node based on a condition associated with at least one of the first measurement of the source node being below a first signal quality threshold or the second measurement of the target node being above a second signal quality threshold. To transmit the UAI, the component 198 may be configured to transmit the UAI via a valid uplink resource at the UE, or to transmit the UAI via multiplexing with at least one of the measurement of the source node or the measurement of the target node prior to an earliest expiration associated with at least one of the BWP inactivity timer or the mobility reception timer. In certain aspects, the base station 102 may have a mobility enhancement component 199 ("component 199") that may be configured to configure, for a UE, a first configuration for an active DL BWP at the UE, a second configuration for a default DL BWP at the UE, a BWP inactivity timer, and a mobility reception timer. The component 199 may also be configured to receive, from the UE, a measurement of at least one of the source node or a target node, where the measurement corresponds to the UE operating on the active DL BWP in the source node, where the BWP inactivity timer and the mobility reception timer are configured with a triggering condition associated with the measurement. The component 199 may also be configured to provide, for the UE via DL signaling and based on the measurement of at least one of the source node or the target node, mobility information that includes a handoff command associated with the target node, where the DL signaling corresponds to a slot during at least one of the BWP inactivity timer or the mobility reception timer. In another aspect of the disclosure, the component 199 may also be configured to configure, for a UE, a configuration to provide UAI associated with power saving, coverage enhancement, reliability enhancement, measurements, sensing, channel sounding, request for dedicated PRACH resource, and preferred configurations for a beam, a TRP, or a cell in a target node based on a condition associated with at least one of a first measurement of the source node being below a first signal quality threshold or a second measurement of the target node being above a second signal quality threshold. The component 199 may also be configured to receive, from the UE, the UAI based on the configuration. To receive the UAI, the component 199 may also be configured to receive the UAI from the UE via a valid uplink resource or via multiplexing with at least one of the measurement of the source node or the measurement of the target node prior to an earliest expiration associated with at least one of the BWP inactivity timer or the mobility reception timer. Although the following description may be provided in the context of 5G NR, the concepts described herein may be applicable to other similar areas and uses, such as LTE, LTE-A, CDMA, GSM, and other wireless technologies, including advanced 5G (5GA)/6G and any associated frequencies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS<br>Δf = $2^μ$ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^μ$ slots/subframe. The subcarrier spacing may be equal to $2^μ*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
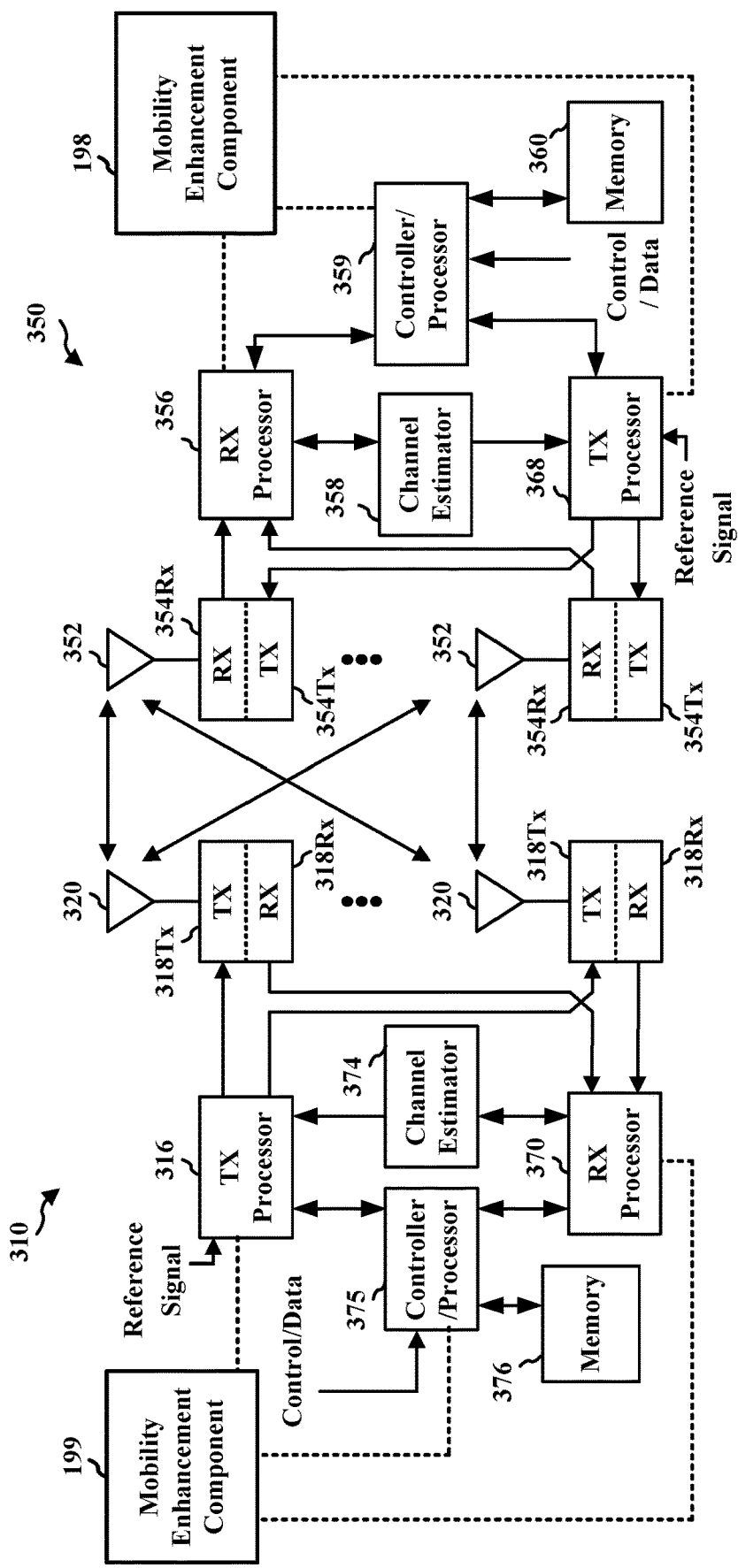
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the mobility enhancement component 198 of FIG. 1. At least one of the TX processor 316, the RX processor 370, and the controller/processor 375 may be configured to perform aspects in connection with the mobility enhancement component 199 of FIG. 1.

Wireless communication networks, such as a 5G NR network, may be designed to include UE mobility. A UE may receive a command(s), RRC configuration(s), or RRC re-configuration(s) from a network for mobility operations. For example, a UE may make measurements related to a source node and a target node(s) and provide such measurements in a report to the source node which may in turn initiate or trigger cell-level mobility, TRP-level mobility, or beam-level mobility. In some aspects, the mobility may include a handover (HO) operation to a target node from a source node, by way of example. HO failure may occur in some cases when communications between the UE and the source node do not complete. Compounding this issue, the UE may be configured to perform a BWP switch from operating in an active DL BWP on the source node to a default DL BWP. In some aspects, the BWP switch may be triggered by, or based on, an expiration of an inactivity timer. The default DL BWP may provide power savings for the UE, and the UE may transition to the default DL BWP after a period of inactivity in order to save power. In such configurations, the HO command from the source node may be transmitted by the network in the active DL BWP, while the UE has switched to the default DL BWP. The network side operations for a HO may include multiple processing steps and may require some time to complete. In such cases, the UE may miss the HO command entirely, as well as the opportunity for a network initiated HO.

In other words, latency in the network-side response for mobility operations may be problematic with respect mobility and power saving. For example, in network-initiated mobility procedures, such as HO and inter-node (e.g., cell, TRP, etc.) beam switching, it may take time for a UE to receive re-configuration signaling via RRC (e.g., 'RRCReconfiguration') after sending a measurement report to the source node that triggers the reconfiguration, due, for example, to the multiple processing steps and signaling exchange sequentially performed by the source node and the target node. For instance, a source node may process the UE's measurement reports for mobility, send a request for HO/beam switching to a target node based on the outcome of measurement reports, receive an acknowledgment (ACK) to the request for HO/beam switching from the target node, and send the re-configuration signaling via RRC (e.g., 'RRCReconfiguration') message to the UE. Similarly, a target node may receive a request for HO/beam switching from the source node, perform admission control and provide the new RRC configurations as part of the acknowledgement to the request for HO/beam switching, and transmit the acknowledgement to the source node. Regarding increased latency/power/signaling overhead that may result from BWP switching(s), if a UE is configured with a BWP inactivity timer for power saving on the source node, and the BWP inactivity timer expires before the UE receives a command for HO/beam switching (e.g., via DCI or RRC ('RRCReconfiguration')), the UE may fall back to the default DL BWP and miss the opportunity for the network-initiated mobility. Additionally, because the link quality is unlikely to improve in the default DL BWP, the UE may be forced to attempt an RRC re-establishment, or to initiate cell selection/re-selection after releasing its RRC connection with the source node as a result of RRC re-establishment failure. Moreover, PRACH resources may not be configured in an UL BWP associated with the default DL BWP or the active DL BWP for the UE, which may force the UE to switch BWPs again for RACH.

Some mobility enhancement schemes (e.g., dual active protocol stack (DAPS) and conditional HO (CHO)) may improve the robustness and reduce the latency of mobility in some scenarios, yet may have higher implementation complexity for the network/UE (dual connectivity to source and target nodes), or may consume more network resources (e.g., early data forwarding and RACH resource reservation across multiple target nodes). There may also be additional challenges for mobility in wireless communication such as 5GA/6G. For instance, with network-side densification and new spectrum opened for 5GA/6G, as well as expanded support for new devices with higher speeds, frequent cell-level/beam-level mobility may be more frequent for the UE and/or the network.

Aspects herein enable a UE to be configured to advantageously manipulate BWP inactivity timers (e.g., stop, pause, continue, restart, reset, etc.) and utilize one or more additional timers (which may be referred to as mobility reception timers or by another name) to allow the UE to remain in an active DL BWP in a source node for additional time to monitor DL search space sets for mobility information from the source node. With the additional monitoring time, the UE may be enabled to switch, from a first beam, a first TRP, or a first cell in the source node, to a second beam, a second TRP, or a second cell in the target node, while the UE still remains enabled to switch from the active DL BWP to the default DL BWP after enough time passes. Additionally, the UE may provide UAI, for mobility enhancements, via a valid UL resource or via multiplexing with the measurement report based on a condition associated with a measurement in the measurement report. Accordingly, aspects provide for mobility enhancements, such as in connected modes, which may be applied in wireless communication implementations, including 5G, 5GA, and 6G, among other examples, to improve power saving, latency, and robustness of mobility at cell-levels, TRP-levels, and/or beam-levels.

Figure 4:
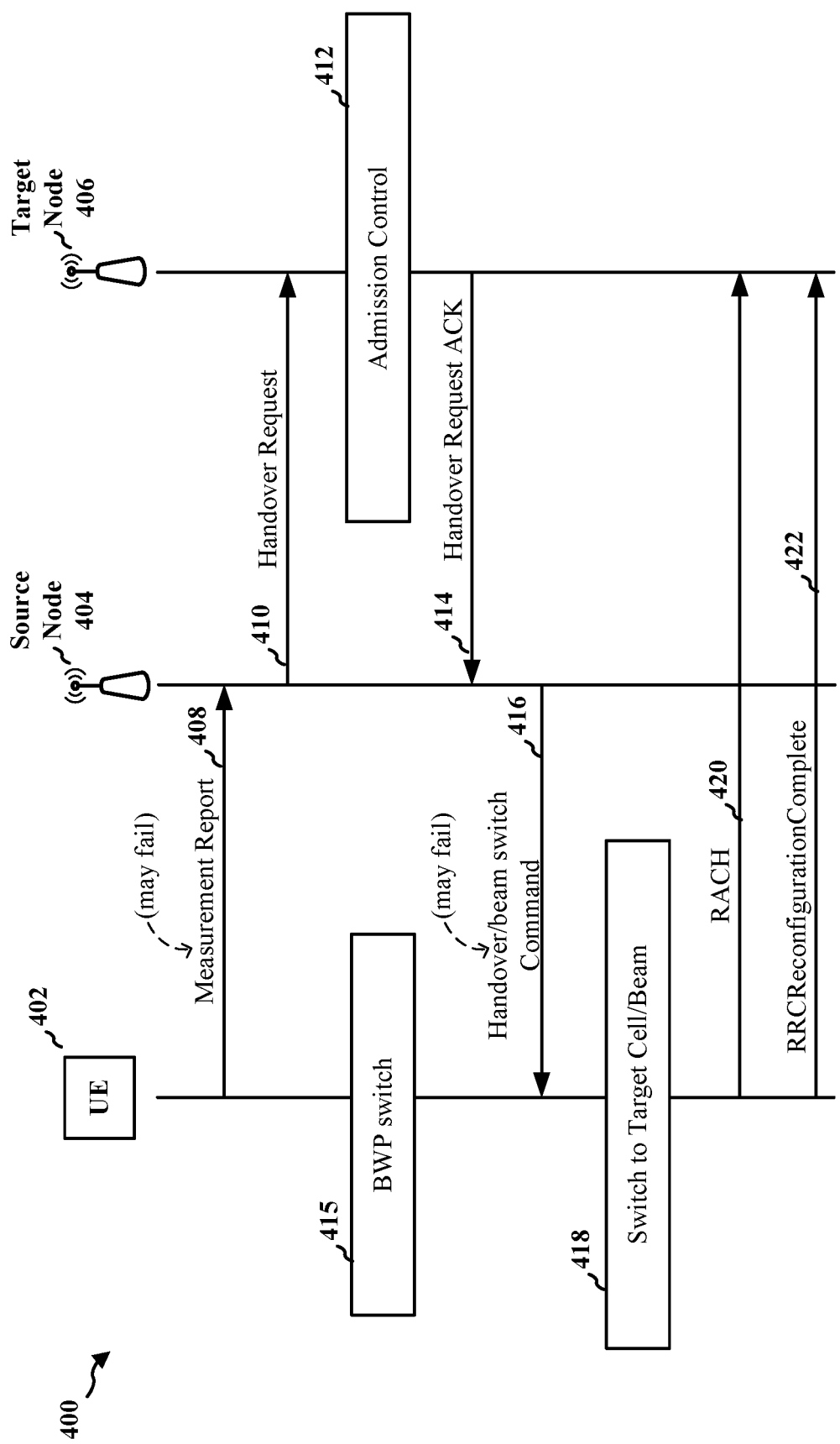
FIG. 4 is a diagram illustrating example UE mobility configurations, in accordance with various aspects of the present disclosure.

FIG. 4 is a diagram 400 illustrating example UE mobility configurations, in various aspects. In aspects, diagram 400 may be for cell-level and/or beam-level mobility of a UE 402 in an RRC connected state (e.g., 'RRC_CONNECTED') with a source node 404 (e.g., a source base station or a portion thereof). As shown, cell-level/beam-level mobility of the UE 402 may be performed with respect to a target node 406 (e.g., a target base station or a portion thereof). The source node may be a source base station, and the target node may be a target base station, in some aspects. In other aspects, the source node may be a source TRP, and the target node may be a target TRP. The source and target TRP may be for a same base station or may be for different base stations. In some aspects, the first node may be a first component of a base station, and the second node may be a second component of the same base station or of a different base station.

Network-side initiated mobility may apply to UEs in RRC connected states, and may be categorized into cell-level and beam-level operations. Network-side initiated cell-level/beam-level mobility may be in response to the UE 402 sending measurement reports 408 to the source node 404. The UE 402 may make measurements of the source node 404 and/or the target node 406, e.g., by measurement reference signals on one or more beams from the source node and/or the target node, and provide a measurement report to the source node 404. If the source node 404 determines that the measurement report indicates a mobility operation should take place with the target node 406 (e.g., in response to the measurement for the source node being below a threshold, or the measurement for the target node being better than the measurement for the source node), the source node 404 may provide a HO request 410 to the target node 406. The target node 406 may then be configured to perform admission control 412 associated with the UE 402. On completion of the admission control 412, the target node 406 may provide a HO request acknowledgement (ACK) 414 to the source node 404, which may in turn provide a HO command 416 to the UE 402. The UE 402 may be configured to switch, at 418, to the indicated cell/beam of the target node 406 and as part of the mobility operation, a RACH process 420 may be performed by the UE 402 with the target node 406. When the RACH process 420 is complete, the UE 402 may then provide an indication that the RRC reconfiguration for the mobility operation switching is completed, at 422.

However, as noted above and as illustrated in diagram 400 of FIG. 4, HO failure may happen when measurement reports 408 of the UE do not reach the source cell, e.g., due to communication failure. In this example, the network is not aware that a condition has occurred that would trigger a node change, and does not initiate the handover. In other aspects, the HO failure may happen when a HO command 416 of the source cell does not reach the UE, e.g., due to communication failure, because the UE is not aware of the HO.

In some aspects, a UE may be configured for a conditional handover (CHO), and the UE may know to initiate the CHO when a measurement at the UE meets a configured condition to trigger the CHO. The CHO may improve the robustness of mobility, yet includes increased signaling overhead and resource reservation to configure the UE with the conditions of the CHO and to provide resources for the CHO. A dual active protocol stack (DAPS) may similarly improve robustness for mobility, yet includes increase signaling overhead and may use additional power at the UE.

Figure 5:
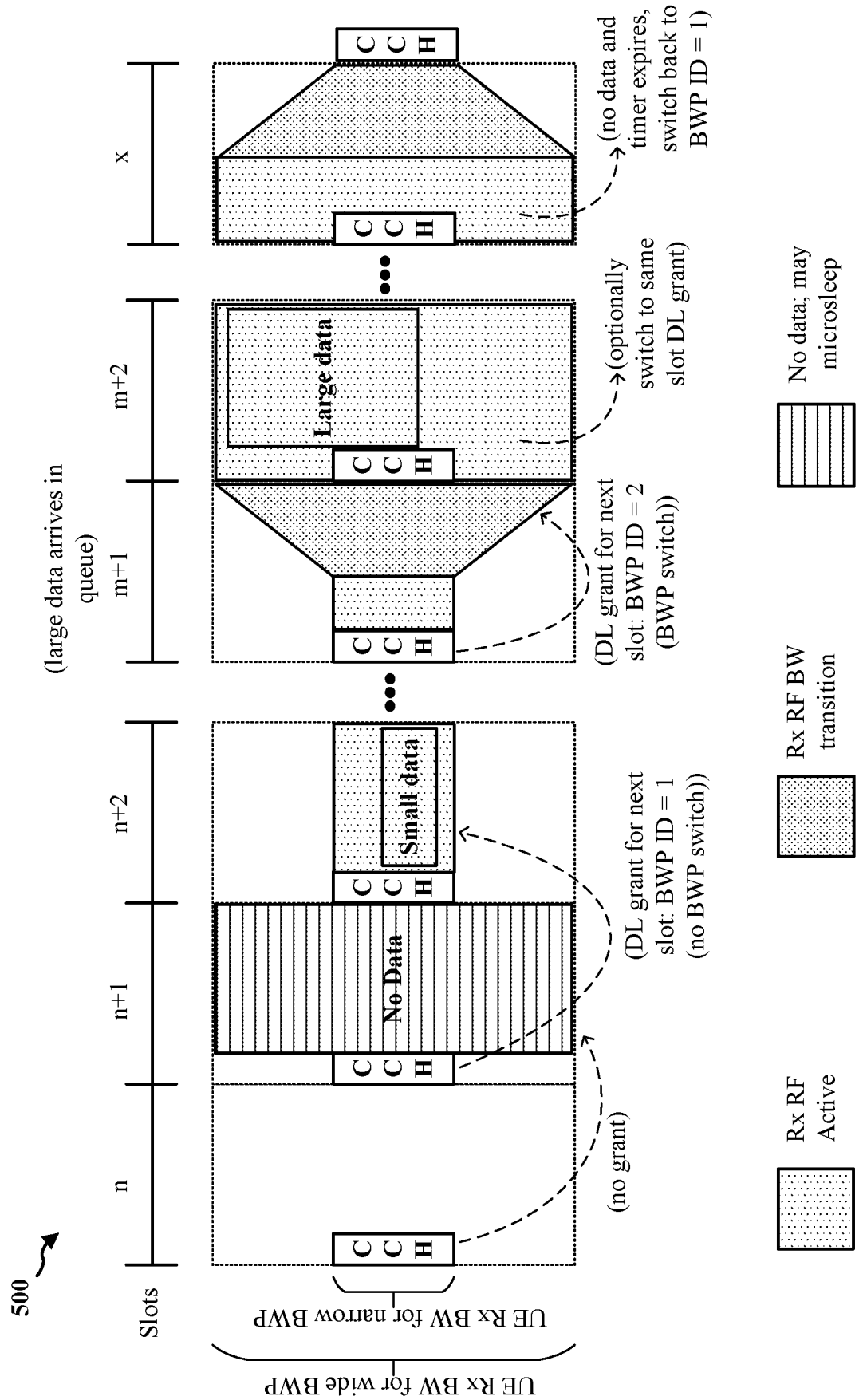
FIG. 5 is a diagram illustrating example bandwidth part (BWP) switching, in accordance with various aspects of the present disclosure.

A UE may communicate with a network based on a BWP, which spans a portion of a total channel bandwidth configured for a cell. A UE may be configured with multiple BWPs, each spanning a contiguous set of frequency resources, e.g., a set of PRBs. A BWP may be activated for the UE from the set of configured BWPs. The UE may not be expected to receive PDSCH, PDCCH, CSI-RS, TRS, etc. outside of an active DL BWP. The UE may not transmit PUSCH or PUCCH outside of an active UL BWP. The UE may receive an indication from a network to switch from a first active BWP to a second active BWP from the set of configured BWPs. In some aspects, the UE may switch from the active DL BWP to a default DL BWP based on a period of inactivity. The default DL BWP may provide power savings for the UE, and the UE may switch to the default DL BWP in response to the expiration of an inactivity timer in order to save power. FIG. 5 is a diagram 500 illustrating example BWP switching, in accordance with various aspects of the present disclosure. Diagram 500 is illustrated with respect to slots in which a smaller/narrower DL BWP or a larger/wider DL BWP may be configured, where the narrower DL BWP may be configured as a default DL BWP for power savings.

As shown in diagram 500, control channel (CCH) information may indicate if a next slot has a grant or not. For example, with the narrow DL BWP configured, slot n includes a CCH with no grant, and accordingly, there is no data in slot n+1, e.g., which may be conducive to microsleep. The CCH in slot n+1, however, includes a grant for slot n+2 in the narrow DL BWP (ID=1) for a small amount of data that can be received by a UE in a single slot having the narrow DL BWP. Accordingly, slot n+2 includes the grant and the small amount of data, and no BWP switch is performed.

When operating in an active DL BWP of source cell, a UE may be provided with a default DL BWP and a timer value, e.g., by 'bwp-inactivityTimer'. The UE may be configured to decrement the timer (e.g., at the end of a subframe for FR1, or at the end of a half subframe for FR2), and if the UE does not receive DCI indicating a DL assignment/UL grant, or a MAC PDU for unicast/multicast broadcast signal (MBS) in a configured DL assignment on the active BWP (e.g., during the interval of the subframe for FR1 or of the half subframe for FR2).

At slot m+1, a large amount of data arrives in queue, and the corresponding CCH indicates a DL grant for large data, which will cause a BWP switch to wide BWP ID=2, for the next slot: m+2. At slot m+2, the large data is received by the UE via the wide BWP (while not drawn to scale, FIG. 5 illustrates that the large data may not be carried within the narrow BWP, hence the switch. At a later slot x, it may be assumed that no new data has been received via the wide BWP, and that a timer has expired, such that the UE is configured to switch from the wider, active DL BWP (ID=2) to the narrower, default DL BWP (ID=1) for power and signaling efficiencies. That is, the UE may be configured to switch to the default DL BWP of source cell (e.g., a narrower BWP) when the BWP timer expires after some period of scheduling inactivity. If the UE receives a DL grant, the UE may switch to the wider, active DL BWP to receive the DL data according to the DL grant. The UE may remain on the active DL BWP until the inactivity timer expires, again, at which time the UE may switch back to the narrower default DL BWP.

Time gaps may be provided at the end of the slots to accommodate uplink control blocks (ULCBs) for TDD are not illustrated for clarity and brevity.

As discussed above, if the UE switches to the default DL BWP based on inactivity and during a time after the UE sends the measurement report, such as shown at 415 in FIG. 4, the UE may miss the HO/beam switch command that results from the measurement report. The UE may miss the opportunity for the network initiated mobility. If the link quality does not improve in the default DL BWP, the UE may attempt RRC re-establishment or the initiation of cell selection/re-selection after releasing an RRC connection with the source node as part of an RRC re-establishment failure. PRACH resources may not be configured in an UL BWP associated with the default DL BWP or the active DL BWP, and the UE may switch BWPs in order to perform the RACH.

Figure 6:
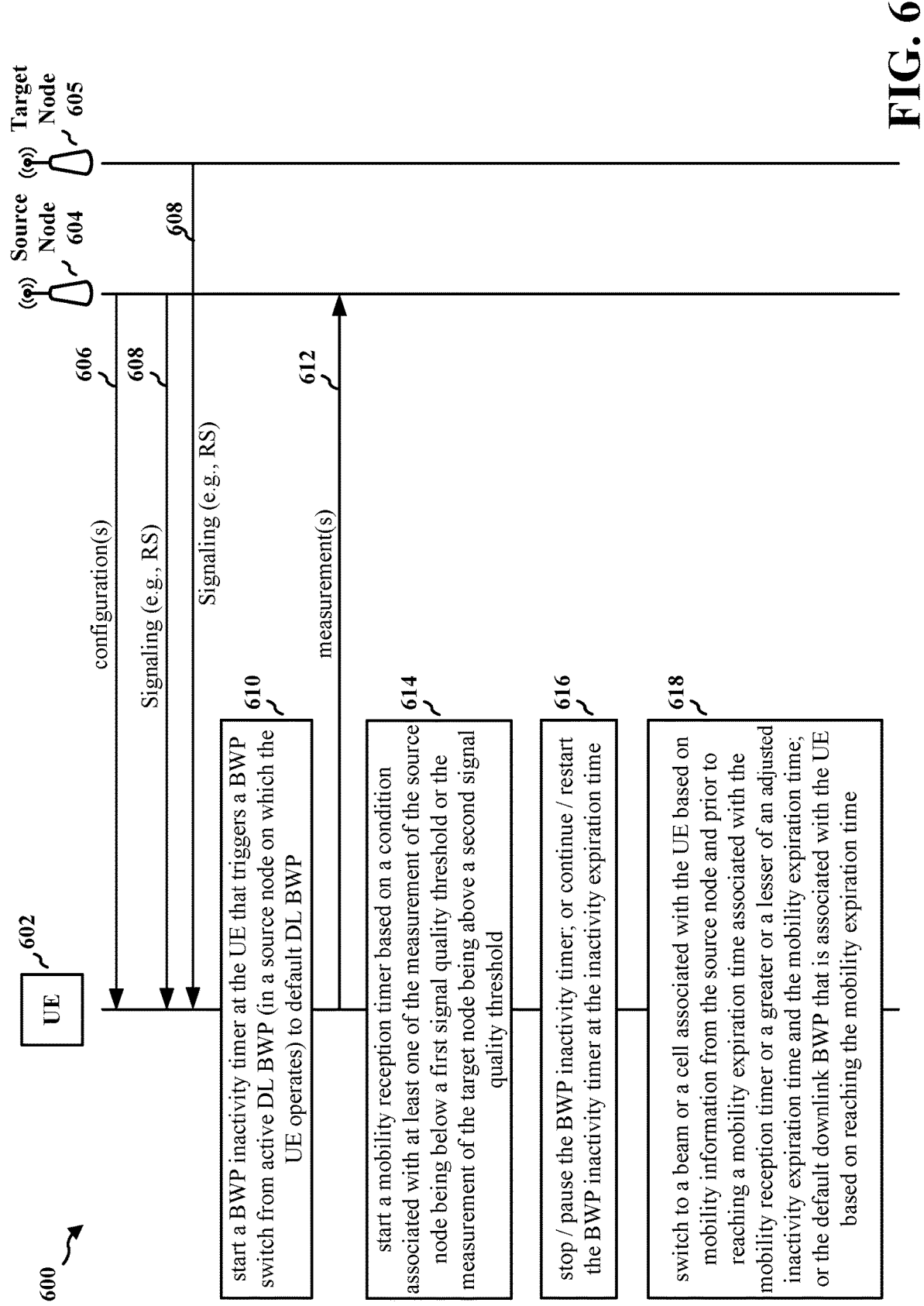
FIG. 6 is a call flow diagram for wireless communications, in accordance with various aspects of the present disclosure.

FIG. 6 is a call flow diagram 600 for wireless communications, in various aspects. Call flow diagram 600 illustrates mobility enhancements and power saving considerations for user equipment in wireless communications, and illustrates configuring a UE 602 therefore via configurations from a source node 604 of a network in the context of a target node 605 (e.g., either may be a base station, such as a gNB or other type of base station, by way of example, as shown), in various aspects. The source node may be a source base station, and the target node may be a target base station, in some aspects. In other aspects, the source node may be a source TRP, and the target node may be a target TRP. The source and target TRP may be for a same base station or may be for different base stations. In some aspects, the first node may be a first component of a base station, and the second node may be a second component of the same base station or of a different base station. Aspects described for the source node 604 and/or the target node 605 may be performed by a base station in aggregated form and/or by one or more components of the base station in disaggregated form. Additionally, or alternatively, some aspects may be performed by the UE 602 autonomously, in addition to, and/or in lieu of, configurations provided to the UE 602 from the source node 604.

In the illustrated aspect, the UE 602 may be configured to receive, from the source node 604, one or more configurations 606. In aspects, the configurations 606 may be received by the UE 602, as transmitted by the source node 604, via DCI, RRC signaling, and/or the like. The configurations 606 may include, without limitation, a configuration for at least one of an active DL BWP, a default DL BWP, a BWP inactivity timer, a first expiration time of the BWP inactivity timer, a mobility reception timer, a second expiration time of the mobility reception timer, one or more measurement objects, a transmission and resource allocation scheme for the measurement reporting, a first number of monitoring occasions for a search space set and a DL control signaling format before the mobility reception timer starts, a second number of monitoring occasions for the search space set and the DL control signaling format after the mobility reception timer starts, a scrambling sequence for the DL control signaling or mobility information, an identifier for the UE 602 or a UE group including the UE 602, a transmission and resource allocation scheme for UE assistance information, a first signal quality threshold of the source node, a second signal quality threshold of the target node, a reporting resource, an adjusted first expiration time, etc.

In aspects, examples of a transmission scheme may include, without limitation, a modulation and coding scheme (MCS), number of MIMO layers, a TB size, an aggregation factor for PDSCH, an aggregation level for PDCCH, a number of repetitions for PDCCH/PDSCH, demodulation reference signal (DMRS) bundling for PDCCH/PDSCH, a redundancy version of PDSCH, a cyclic redundancy check (CRC) attachment scheme for PDCCH/PDSCH, scheduling and mapping granularity for PDCCH/PDSCH (e.g., slot based, sub-slot based), and/or the like. In aspects, examples of resource allocation may include, without limitation, a number of RBs, a number of symbols, a number of slots, a density of DMRS for PDSCH/PDCCH, and/or the like.

The UE 602 may be configured to receive, from the source node 604 and/or the target node 605, signaling 608. The UE 602 may be configured to make a measurement(s) 612, described below, that correspond the source node 604 and/or the target node 605 based on the signaling 608, where the measurement(s) 612 may be associated with UE mobility operations. The signaling may include one or more reference signals, such as a CSI-RS, SSB, etc., which may be measurement over one or more beams for the source node and/or the target node. The measurement information may include one or more of a reference signal received power (RSRP), reference signal received quality (RSRQ), or information based on an RSRP/RSRQ, among other examples of measurement information. The UE 602 may be configured to start, at 610, a BWP inactivity timer at the UE 602 that may trigger a BWP switch from an active DL BWP (e.g., a wider BWP) to the default DL BWP (e.g., a narrower BWP) after the BWP inactivity timer expires at a first expiration time with no communication for the UE. In aspects, the BWP inactivity timer may be configured with an expiration time before which the UE may be configured to monitor the active DL BWP for mobility information prior to switching back to the default (e.g., narrower) DL BWP or to perform a mobility operation with respect to the target node 605. Next, the UE 602 may transmit to the source node 604 the measurement(s) 612, which may include more than one measurement, in aspects. For example, the UE 602 may transmit or report a measurement of at least one of the source node 604 or the target node 605 to the source node 604.

The UE 602 may be configured to start, at 614, a mobility reception timer based on a condition associated with the measurement(s) 612 of the source node 604 being below a first signal quality threshold and/or the measurement(s) 612 of the target node 605 being above a second signal quality threshold. For example, if the measurement(s) 612 of the source node 604 is/are lower than a configured signal quality threshold and/or if the measurement(s) 612 of the target node 605 is/are above another configured signal quality threshold, the UE 602 may be configured to start, at 614, the mobility reception timer having an expiration time by which the UE 602 may be configured to monitor the active DL BWP for mobility information prior to switching back to the default (e.g., narrower) DL BWP or to perform the mobility operation with respect to the target node 605. That is, the mobility reception timer may enable the UE 602 to monitor for the mobility information (e.g., to wait to receive the mobility information) longer than the BWP inactivity timer may allow (e.g., based on the latency for mobility operations noted above). In aspects, the UE 602 may be configured to start the mobility reception timer (at 614) before the BWP inactivity timer expires at its first expiration time based at least on determining a time duration between a time of reporting the measurement and the first expiration time of the BWP inactivity timer (e.g., before the adjustment of the BWP inactivity expiration time) is lower than a pre-configured threshold for the mobility reception timer, where the BWP inactivity timer may be associated with a first time window configuration for the UE 602 to receive control and data information that is unicast or multicast to the UE 602, and the mobility reception timer may be associated with a second time window configuration for the UE 602 to receive the mobility information associated with the UE 602 or a UE group of which the UE 602 is a part.

The UE 602 may be configured, at 616, to stop/pause the BWP inactivity timer, or to continue/restart the BWP inactivity timer at the inactivity expiration time, based on starting the mobility reception timer, in various aspects. In one aspect, the UE 602 may be configured to stop or pause the BWP inactivity timer while the mobility reception timer runs, thus providing the UE 602 additional time to monitor/receive the mobility information based on the mobility reception timer. For example, the UE 602 may be configured to monitor at least one search space set in the active DL BWP of the UE 602 for DL control signaling associated with the mobility information received from the source node 604, while the mobility reception timer is active. The UE 602 may be further configured to restart the BWP inactivity timer after starting the mobility reception timer, where the restarted BWP inactivity timer is associated with an adjusted first expiration time. In aspects, the adjusted first expiration time may be an integer multiple, or a portion of, the first expiration time, described in further detail below. In aspects, the UE 602 may be configured to monitor at least one search space set of DL control signaling received from the source node 604 for the mobility information by reducing a number of monitoring occasions for the DL control signaling subsequent to starting the mobility reception timer, based at least on a pre-configured rule (e.g., a hard coded rule, or a rule configured by the network), a reduction configuration from the source node 604, UE assistance information (UAI) for power saving (e.g., may be transmitted from the UE 602 to the source node 604, as described below, before the mobility reception timer starts), or a hybrid thereof. In aspects, the search space set(s) associated with mobility information reception may include one or more of a common search space (CSS) set or a UE-specific search space (USS) set configuration, an identifier for the UE or a UE group including the UE, a DL control signaling format configured for PDCCH ordered timing advance or mobility procedure, or a combination thereof.

In another aspect, the UE 602 may be configured (at 616) to continue running or to restart the BWP inactivity timer while the mobility reception timer runs, thus providing the UE 602 additional time to monitor/receive the mobility information based on the mobility reception timer and/or an adjusted expiration time of the BWP inactivity timer. In one example, the UE 602 may be further configured to restart the BWP inactivity timer after starting the mobility reception timer, where the restarted BWP inactivity timer is associated with an adjusted first expiration time. In aspects, the adjusted first expiration time may be an integer multiple, or a portion of, the first expiration time, as described in further detail below.

The UE 602 may be configured to, at 618, switch to a beam or a cell associated with the UE 602 for the target node 605 based on mobility information from the source node 604 and prior to reaching (1) a mobility expiration time associated with the mobility reception timer or (2) a greater or a lesser of the adjusted inactivity expiration time and the mobility expiration time, or may be configured to switch to the default downlink BWP that is associated with the UE 602 based on reaching the mobility expiration time, as described in further detail below.

Figure 7:
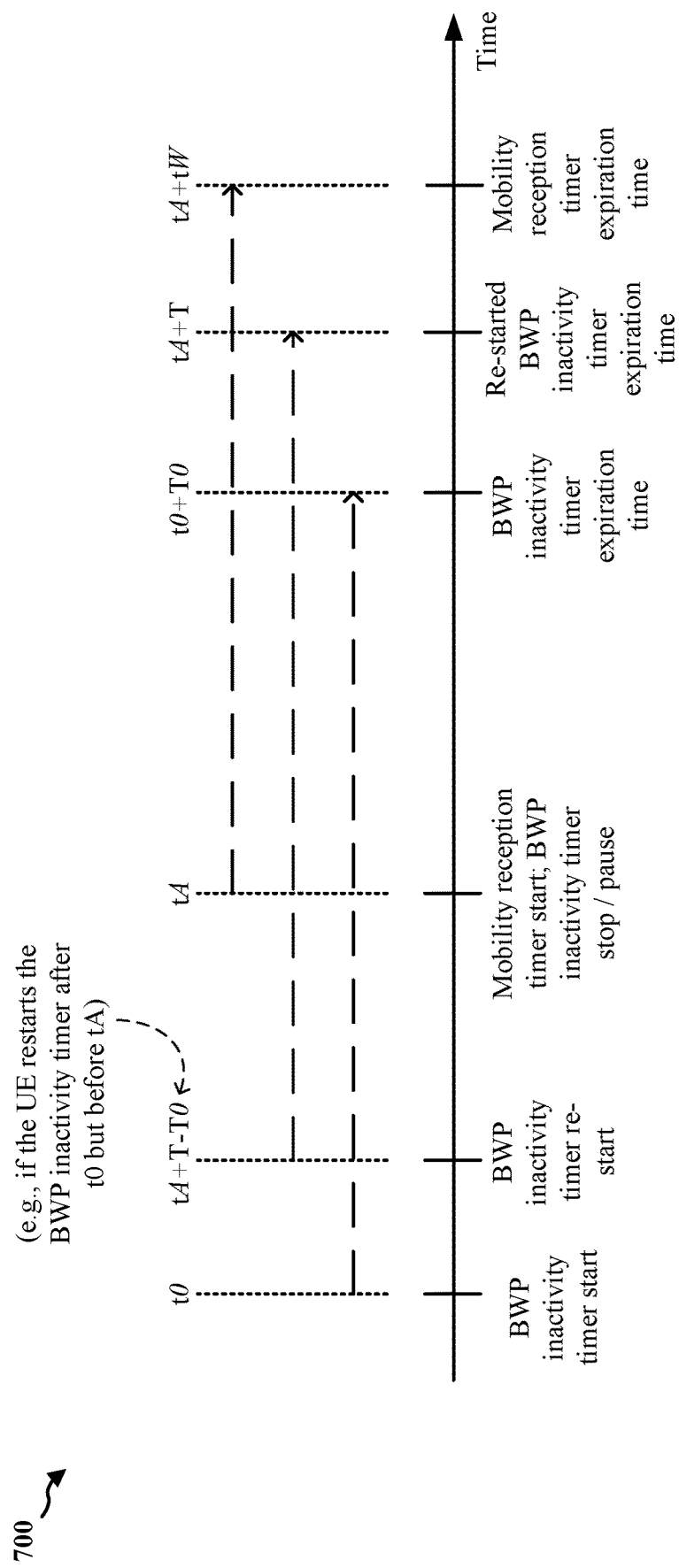
FIG. 7 is a diagram illustrating example timing configurations for UE mobility, in accordance with various aspects of the present disclosure.

FIG. 7 is a diagram 700 illustrating example timing configurations for UE mobility, in accordance with various aspects of the present disclosure. Diagram 700 shows, by way of example, timers and expiration times described above for diagram 600 in FIG. 6 with respect to time.

In aspects, there may be one or more conditions by which a UE may be triggered to start, stop, restart, continue, reset, etc., its BWP inactivity timer. For example, and without limitation, the UE may be operating in an active DL BWP of source node, the UE may have obtained/reported its measurements (e.g., radio resource management (RRM)) of source node (e.g., cell, TRP, etc.), or target node(s) at time epoch tA, the measurements of the source node may be below a set of pre-configured signal quality thresholds (Qs), and/or the measurements of at least one target node may be above a set of pre-configured signal quality thresholds (Qn), and a BWP inactivity timer (X) with a start time t0 and an expiration time T0 may be configured for the UE and the timer BWP inactivity timer may be running before time tA. If the UE does not re-start or stop/pause the BWP inactivity timer X after t0, timer X will expire at t0+T0. If the UE re-starts the BWP inactivity timer X after t0 (e.g., due to PDCCH/PDSCH reception or PUSCH/PUCCH/SRS/PRACH transmission at epoch tA+T−T0), the BWP inactivity timer X may expire at tA+T if the BWP inactivity timer X keeps running (without re-start or pause/stop). In aspects, the active DL BWP, the default DL BWP, and the BWP inactivity timer X (including the expiration time TO) of the UE may be configured by its source node(s).

Regarding pausing or stopping the BWP inactivity timer, as shown in diagram 700 and as described for diagram 600 above, at epoch tA, the UE may be configured to stop/pause the BWP inactivity timer X and start a new timer Y, e.g., the mobility reception timer, for receiving mobility-related DCI or RRC messaging (e.g., CHO conditions, commands for HO or beam switching, etc.), where the mobility reception timer Y may be configured with an expiration time tW and tW>T0. In aspects, the UE may have obtained/reported its measurements at time epoch tA, and if the measurements of the source node were below a set of pre-configured signal quality thresholds (Qs), and/or the measurements of at least one target node were above a set of pre-configured signal quality thresholds (Qn), the UE may be configured to stop/pause the BWP inactivity timer X and to start to mobility reception timer Y at time tA (which may expire at time tA+tW, where tW>T0. The UE may be configured to continue monitoring DL signaling such as PDCCH (e.g., for mobility-related DCI, or DCI scheduling mobility-related RRC message) in USS/CSS resource sets after stopping/pausing the BWP inactivity timer X or starting the mobility reception timer Y. Subsequently, the UE may be configured to start the mobility reception timer Y, and the UE may be configured to reduce the number of monitoring occasions (e.g., for PDCCH) in the active DL BWP based on the UE capabilities, hardcoded rules, and/or rules configured by the network (e.g., by a source node). If the UE receives the mobility-related information, e.g., via DCI or RRC messaging, on or before epoch tA+tW, the UE may be configured to follow the DCI or RRC signaling for beam/cell switching, which may be addressed to the UE identifier (e.g., cell (C) radio network temporary identifier (C-RNTI) or MCS-RNTI) or a group RNTI (e.g., group-based HO or beam switching commands) configured for the UE by the source node. Otherwise, the UE is configured to switch to the default DL BWP of the serving mode when the mobility reception timer Y expires at time epoch tA+tW.

Accordingly, aspects for stopping/pausing the BWP inactivity timer X and/or starting the mobility reception timer Y may provide a UE with additional time to monitor for, and receive, mobility information without switching to the default DL BWP that may lead to the UE missing the mobility information and requiring additional signaling, switching, power consumption, and time for mobility operations to be performed for a target node.

Figure 8:
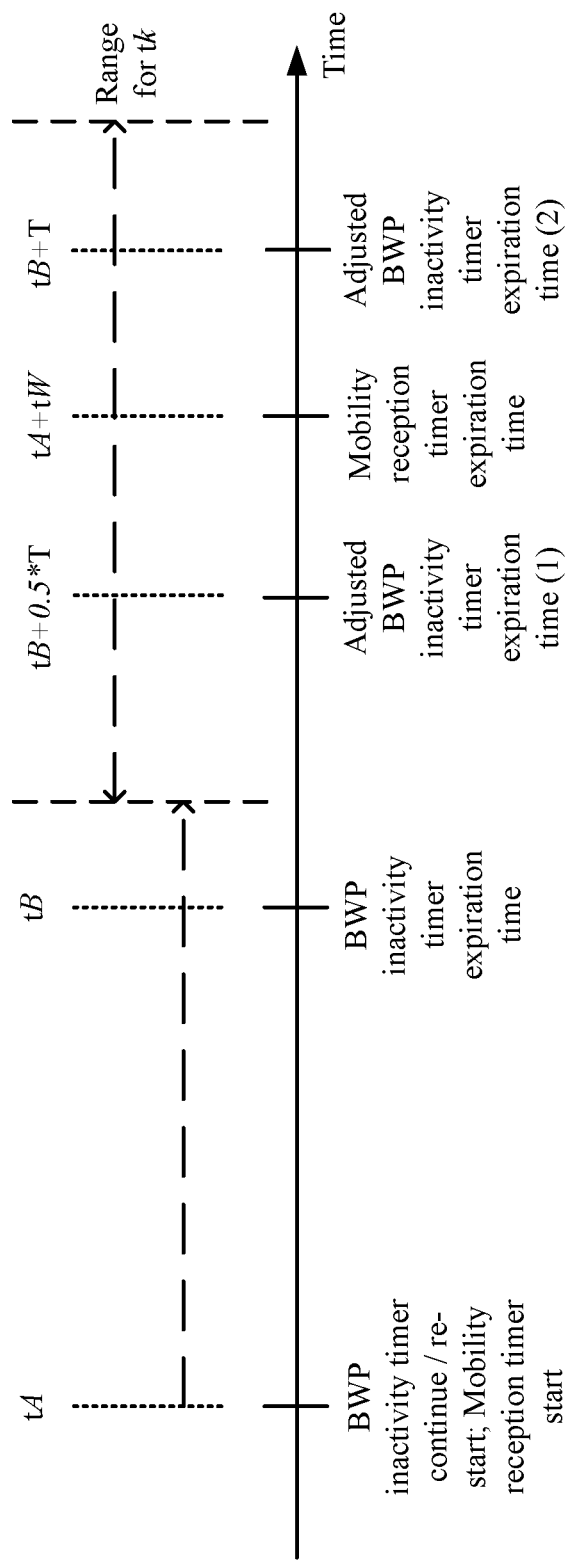
FIG. 8 is a diagram illustrating example timing configurations for UE mobility, in accordance with various aspects of the present disclosure.

FIG. 8 is a diagram 800 illustrating example timing configurations for UE mobility, in accordance with various aspects of the present disclosure. Diagram 800 shows, by way of example, timers and expiration times described above for diagram 600 in FIG. 6 with respect to time.

In aspects, as noted above, there may be one or more conditions by which a UE may be triggered to start, stop, restart, continue, reset, etc., its BWP inactivity timer. For example, and without limitation, the UE may be operating in an active DL BWP of source node, the UE may have obtained/reported its measurements (e.g., radio resource management (RRM)) of source node (e.g., cell, TRP, etc.), or target node(s) at time epoch tA, the measurements of the source node may be below a set of pre-configured signal quality thresholds (Qs), or the measurements of at least one target node may be above a set of pre-configured signal quality thresholds (Qn), and a BWP inactivity timer (X) with an expiration time T0 may be configured for the UE and the timer BWP inactivity timer may be running before time tA.

Regarding continuing or re-starting the BWP inactivity timer, as shown in diagram 800 (which is different than as shown for diagram 700 of FIG. 7) and as described for diagram 600 above, before a UE starts the mobility reception timer Y configured with the expiration time tW, the UE may be configured to determine (1) that the BWP inactivity timer X may expire at time tB if it is not re-started/paused/stopped by the UE after time tA (e.g., the definition of tA may be the same or similar as described above for aspects in diagram 700 of FIG. 7), and (2) that the gap between tA and tB may be less than a pre-configured threshold tW0 (e.g., where tB−tA<tW0), which may be the same value, or a similar value, as the expiration time of the mobility reception timer Y (e.g., tW0=tW), and (3) a termination time tk for DL signaling (e.g., PDCCH) monitoring in the active DL BWP of the source node(s), where tk may be defined as a function of the BWP inactivity timer X and/or the mobility reception timer Y. As examples, but without limitation, tk may be defined as a range, e.g., the max(tB+k*T0, tA+tW), where k>0 and k is a parameter pre-configured by the source node(s), as the min(tB+k*T0, tA+tW), where k>0 and k is a parameter pre-configured by the source node(s), and/or the like. In aspects, as noted above, the UE may be configured to restart the BWP inactivity timer, where the restarted BWP inactivity timer is associated with an adjusted expiration time tk, e.g., based on the parameter k, such that the adjusted first expiration time may be an integer multiple of the expiration time, e.g., tB+T for k=1, or a portion of the expiration time, e.g., tB+0.5*T for k=0.5.

At time epoch tA, the UE may be configured to perform one or more procedures when operating in the active DL BWP of source node(s), e.g., re-starting the BWP inactivity timer X, starting the mobility reception timer Y for receiving mobility-related DCI or RRC messaging (e.g., CHO conditions, commands for HO or beam switching, etc.), where the mobility reception timer Y may be configured with an expiration time tW by the network, e.g., a source node(s). The UE may be configured to then continue monitoring DL signaling, e.g., PDCCH, (for mobility-related DCI, or DCI scheduling mobility-related RRC messaging, etc.) in USS/CSS resource sets after the BWP inactivity timer X and/or the mobility reception timer Y is/are re-started/started and before tk expires. After the UE starts the mobility reception timer Y, the UE may be configured to reduce the number of DL signaling (e.g., PUCCH) monitoring occasions in the active DL BWP based on the UE capabilities, hardcoded rules, and/or rules configured by the source node(s). If the UE receives the mobility-related DCI or RRC messaging on/before tk expires, the UE may be configured to follow the DCI or RRC signaling for beam/cell switching from the source node(s) to the target node(s), which may be addressed to the UE identifier (e.g., C-RNTI, MCS-RNTI, etc.) or a group RNTI (e.g., group-based HO or beam switching commands) configured for the UE by the source node(s). Otherwise, the UE may be configured to switch to the default DL BWP of the source node after tk and stop the BWP inactivity timer X and/or the mobility reception timer Y.

In aspects, the active DL BWP, the default DL BWP, the BWP inactivity timer X, the time tk and parameters thereof, etc. (as noted herein) for the UE may be configured by its source node(s).

Accordingly, aspects for continuing/re-starting pausing the BWP inactivity timer X with an adjusted expiration time and/or starting the mobility reception timer Y may provide a UE with additional time to monitor for, and receive, mobility information without switching to the default DL BWP that may lead to the UE missing the mobility information and requiring additional signaling, switching, power consumption, and time for mobility operations to be performed for a target node.

Figure 9:
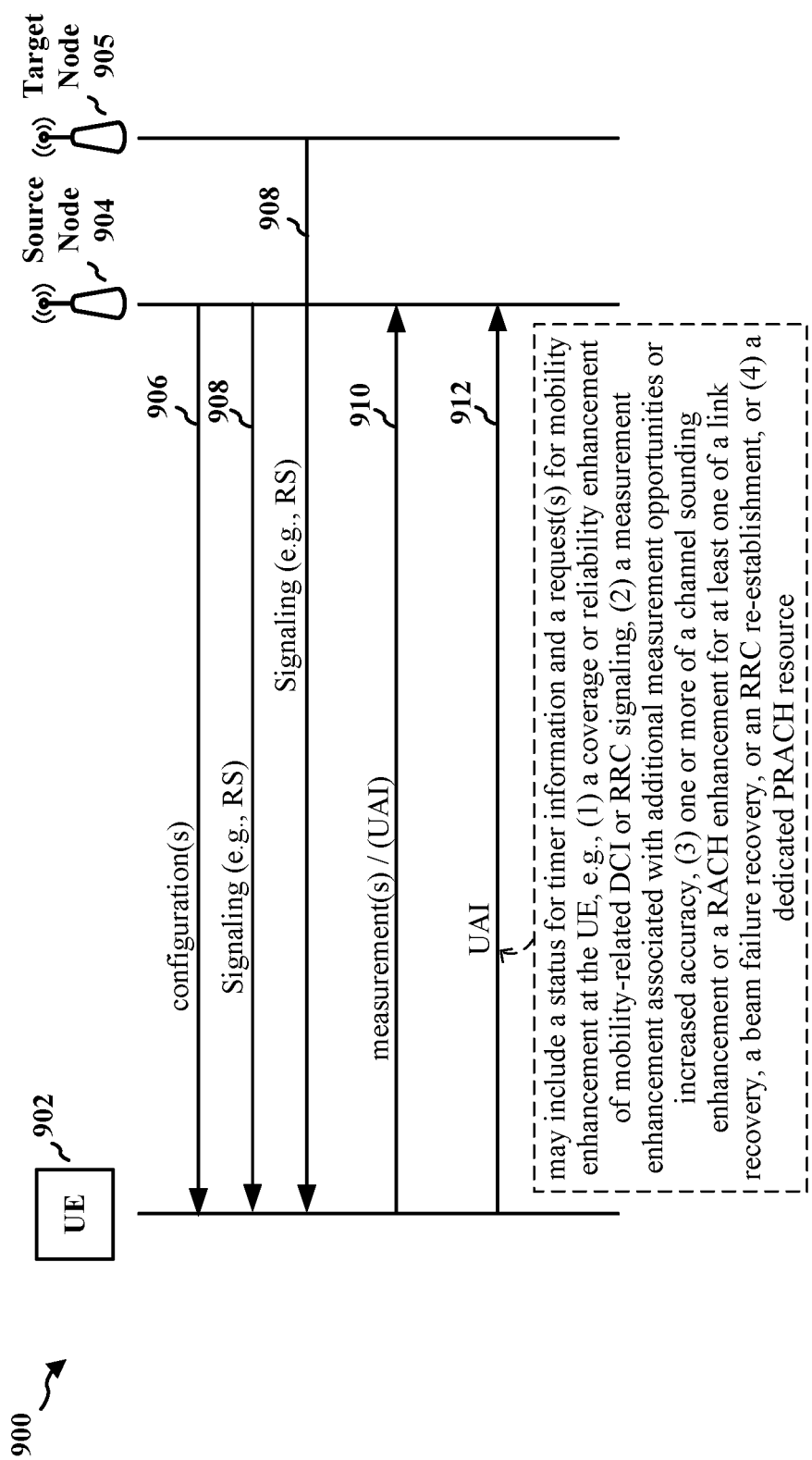
FIG. 9 is a call flow diagram for wireless communications, in accordance with various aspects of the present disclosure.

FIG. 9 is a call flow diagram 900 for wireless communications, in various aspects. Call flow diagram 900 illustrates mobility enhancements and power saving considerations for user equipment in wireless communications, and illustrates configuring a UE 902 therefor via configurations from a source node 904 of a network in the context of a target node 905 (e.g., either may be a base station, such as a gNB or other type of base station, by way of example, as shown), in various aspects. Aspects described for the source node 904 and/or the target node 905 may be performed by a base station in aggregated form and/or by one or more components of the base station in disaggregated form. Additionally, or alternatively, aspects may be performed by the UE 902 autonomously, in addition to, and/or in lieu of, configurations provided to the UE 902 from the source node 904.

In the illustrated aspect, the UE 902 may be configured to receive, from the source node 904, one or more configurations 906. In aspects, the configurations 906 may be received by the UE 902, as transmitted by the source node 904, via DCI, RRC signaling, and/or the like. The configuration(s) 906 may include, without limitation, one or more configurations, for the UE 902, a configuration to provide UAI associated with power saving, coverage enhancement, reliability enhancement, measurements, sensing, channel sounding, request for dedicated PRACH resource, and preferred configurations for a beam, a TRP, or a cell in the target node 905 based on a condition associated with at least one of a measurement of the source node 904 being below a first signal quality threshold or a measurement of the target node 905 being above a second signal quality threshold. The UE 902 may be configured to receive, from the source node 904 and/or the target node 905, signaling 908, e.g., a reference signal such as CSI-RS, SSB, etc. such as described in connection with FIG. 6. The UE 902 may be configured to make a measurement(s) 910 that correspond the source node 904 and/or the target node 905 based on the signaling 908, where the measurement(s) 910 may be associated with UE mobility operations. The UE 902 may be configured to transmit to the source node 904 the measurement(s) 910, which may include more than one measurement, in aspects. For example, the UE 902 may transmit or report a measurement of at least one of the source node 904 or the target node 905 to the source node 904.

The UE 902 may be configured to transmit UAI 912 to the source node 904 based on a condition associated with the measurement information. For example, the measurements collected by the UE and/or the measurement report sent by the UE may trigger the UE to provide the UAI. In aspects, the UAI 912 may be transmitted to the source node 904 via a valid UL resource at the UE or via multiplexing with at least one of the measurement of the source node or the measurement of the target node (e.g., the measurement(s) 910) prior to an earliest expiration associated with at least one of a BWP inactivity timer or a mobility reception timer, as described herein. The UAI may include a status for timer information, in aspects, such as, but not limited to, an earliest expiration of at least one of the BWP inactivity timer or the mobility reception timer, an indication of a stop, a pause, or a start/re-start of at least one of the BWP inactivity timer or the mobility reception timer, etc., such as described in connection with FIGS. 5-8. The UAI 912 may include a request(s), in aspects, such as but not limited to, a request for mobility enhancement at the UE 902, e.g., (1) a coverage or reliability enhancement of mobility-related DCI or RRC signaling, (2) a measurement enhancement associated with additional measurement opportunities or increased accuracy, (3) one or more of a channel sounding enhancement or a RACH enhancement for at least one of a link recovery, a beam failure recovery, or an RRC re-establishment, (4) a dedicated PRACH resource, and/or the like.

In aspects, the coverage or reliability enhancement may be associated with at least one of an aggregation level, repetitions of a control resource set (CORESET), a slot aggregation, TB repetitions, a scaling factor for the DCI or TBs, a DMRS bundling scheme, an additional DMRS configuration, frequency hopping, physical resource block (PRB) interleaving, a MCS adaptation, a waveform adaptation, or a power adaptation. In aspects, the measurement enhancement may be associated with at least one of requests for aperiodic and on-demand transmission of a beam-formed DL reference signal (RS), where the beam-formed DL RS is at least one of a NCD-SSB, channel state information (CSI) reference signal (CSI-RS), a tracking RS (TRS), or another DL RS in the source node or the target node. In aspects, the channel sounding enhancement or the RACH enhancement may be associated with an on-demand allocation of channel sounding reference signal (RS) or physical random access channel (PRACH) resources for a prioritized random access procedure, and the PRACH may be configured in an UL BWP associated with the default DL BWP or the active DL BWP for the UE 902.

In some aspects, there may be conditions present by which the UE 902 is triggered to transmit the UAI 912 to the source node 904 for mobility enhancement. For example, and without limitation, the UE 902 may have obtained its measurements (e.g., radio resource management (RRM)) of source node (e.g., cell, TRP, etc.), or target node(s), the measurements of the source node may be below a set of pre-configured UAI signal quality thresholds (Q's), and/or the measurements of at least one target node may be above a set of pre-configured UAI signal quality thresholds (Q'n), and the UE 902 is configured with a valid UL resource or to multiplex the UAI 912 and the measurement(s) 910 before an earliest expiration of at least one of the BWP inactivity timer or the mobility reception timer.

Figure 10:
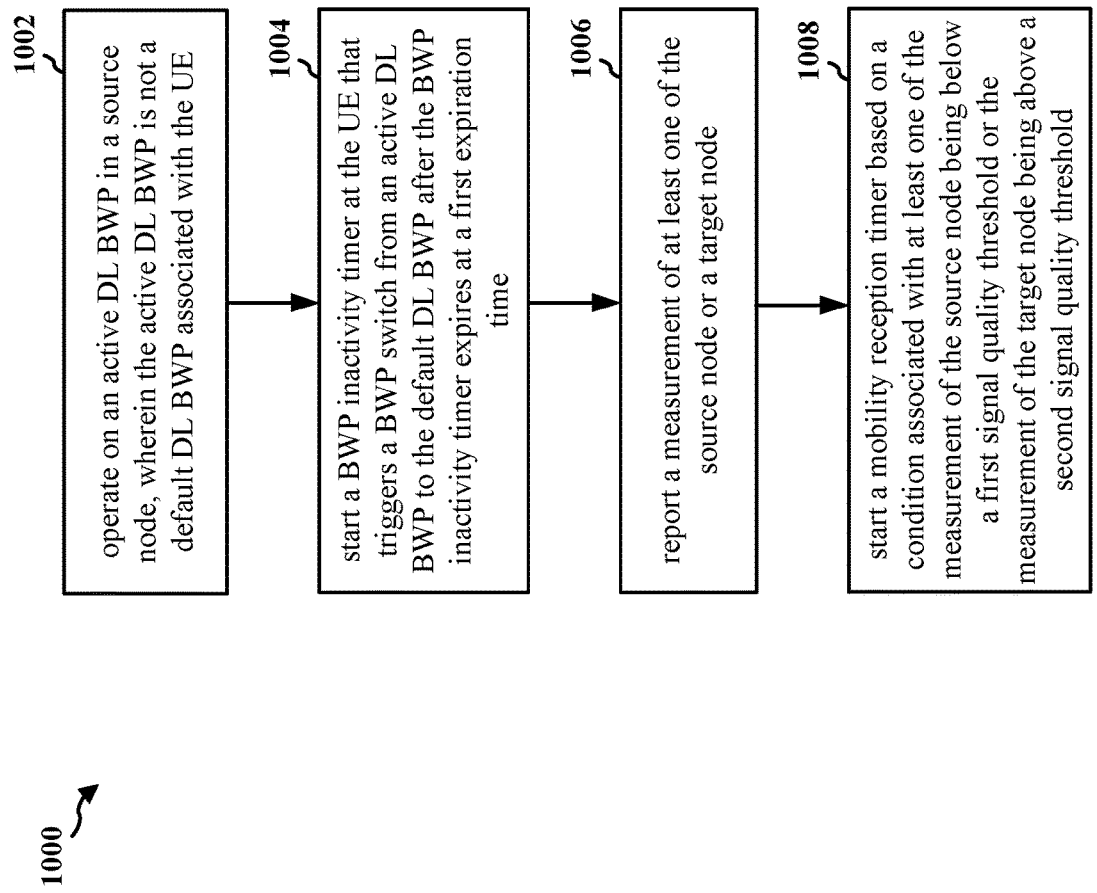
FIG. 10 is a flowchart of a method of wireless communication, in accordance with various aspects of the present disclosure.

FIG. 10 is a flowchart 1000 of a method of wireless communication. The method may be performed by a UE (e.g., the UE 104, 602, 902; the apparatus 1704). At 1002, the UE is configured to operate on an active DL BWP in a source node, where the active DL BWP is not a default DL BWP associated with the UE. In some aspects, 1002 may be performed by the component 198. For instance, with reference to FIGS. 6, and 5, the UE 602 may be configured to operate on an active DL BWP (e.g., as in slot m+2 in FIG. 5; as shown at 610 in FIG. 6) in a source node 604, where the active DL BWP is not the default DL BWP (e.g., as in slot n+2 in FIG. 5).

At 1004, the UE is configured to start a BWP inactivity timer at the UE that triggers a BWP switch from an active DL BWP to the default DL BWP after the BWP inactivity timer expires at a first expiration time. In some aspects, 1004 may be performed by the component 198. For instance, with reference to FIGS. 6, and 7, 8, the UE 602 may be configured to start, at 610 (e.g., t0 in FIG. 7; tA in FIG. 8), a BWP inactivity timer at the UE 602 that may trigger a BWP switch from an active DL BWP (e.g., a wider BWP) to the default DL BWP (e.g., a narrower BWP) after the BWP inactivity timer expires at a first expiration time (e.g., t0+T0 in FIG. 7; tB in FIG. 8). In aspects, the BWP inactivity timer may be configured with an expiration time (e.g., t0+T0 in FIG. 7; tB in FIG. 8) before which the UE may be configured to monitor the active DL BWP for mobility information prior to switching back to the default (e.g., narrower) DL BWP or to perform a mobility operation with respect to the target node 605.

At 1006, the UE is configured to report a measurement of at least one of the source node or a target node. In some aspects, 1006 may be performed by the component 198. For instance, with reference to FIG. 6, the UE 602 may be configured to make a measurement(s) 612 that correspond the source node 604 and/or the target node 605 based on the signaling 608, where the measurement(s) 612 may be associated with UE mobility operations. the UE 602 may be configured to transmit to the source node 604 the measurement(s) 612, which may include more than one measurement, in aspects. For example, the UE 602 may transmit or report a measurement of at least one of the source node 604 or the target node 605 to the source node 604.

At 1008, the UE is configured to start a mobility reception timer based on a condition associated with at least one of the first measurement of the source node being below a first signal quality threshold or the second measurement of the target node being above a second signal quality threshold. In some aspects, 1008 may be performed by the component 198. For instance, with reference to FIGS. 6, 7, 8, the UE 602 may be configured to start, at 614, a mobility reception timer based on a condition associated with the measurement(s) 612 of the source node 604 being below a first signal quality threshold and/or the measurement(s) 612 of the target node 605 being above a second signal quality threshold. For example, if the measurement(s) 612 of the source node 604 is/are lower than a configured signal quality threshold and/or if the measurement(s) 612 of the target node 605 is/are above another configured signal quality threshold, the UE 602 may be configured to start, at 614 (e.g., tA in FIGS. 7, 8), the mobility reception timer having an expiration time (e.g., tA+tW in FIGS. 7, 8) by which the UE 602 may be configured to monitor the active DL BWP for mobility information prior to switching back to the default (e.g., narrower) DL BWP or to perform the mobility operation with respect to the target node 605. That is, the mobility reception timer may enable the UE 602 to monitor for the mobility information (e.g., to wait to receive the mobility information) longer than the BWP inactivity timer may allow (e.g., based on the latency for mobility operations noted above). In aspects, the UE 602 may be configured to start the mobility reception timer (e.g., at 614 in FIG. 6; tA in FIGS. 7, 8) before the BWP inactivity timer expires at its first expiration time (e.g., t0+T0 in FIG. 7; tB in FIG. 8) based at least on determining a time duration between a time of reporting the measurement and the first expiration time of the BWP inactivity timer (e.g., before the adjustment of the BWP inactivity expiration time) is lower than a pre-configured threshold for the mobility reception timer, where the BWP inactivity timer may be associated with a first time window configuration for the UE 602 to receive control and data information that is unicast or multicast to the UE 602, and the mobility reception timer may be associated with a second time window configuration for the UE 602 to receive the mobility information associated with the UE 602 or a UE group of which the UE 602 is a part.

Figure 11:
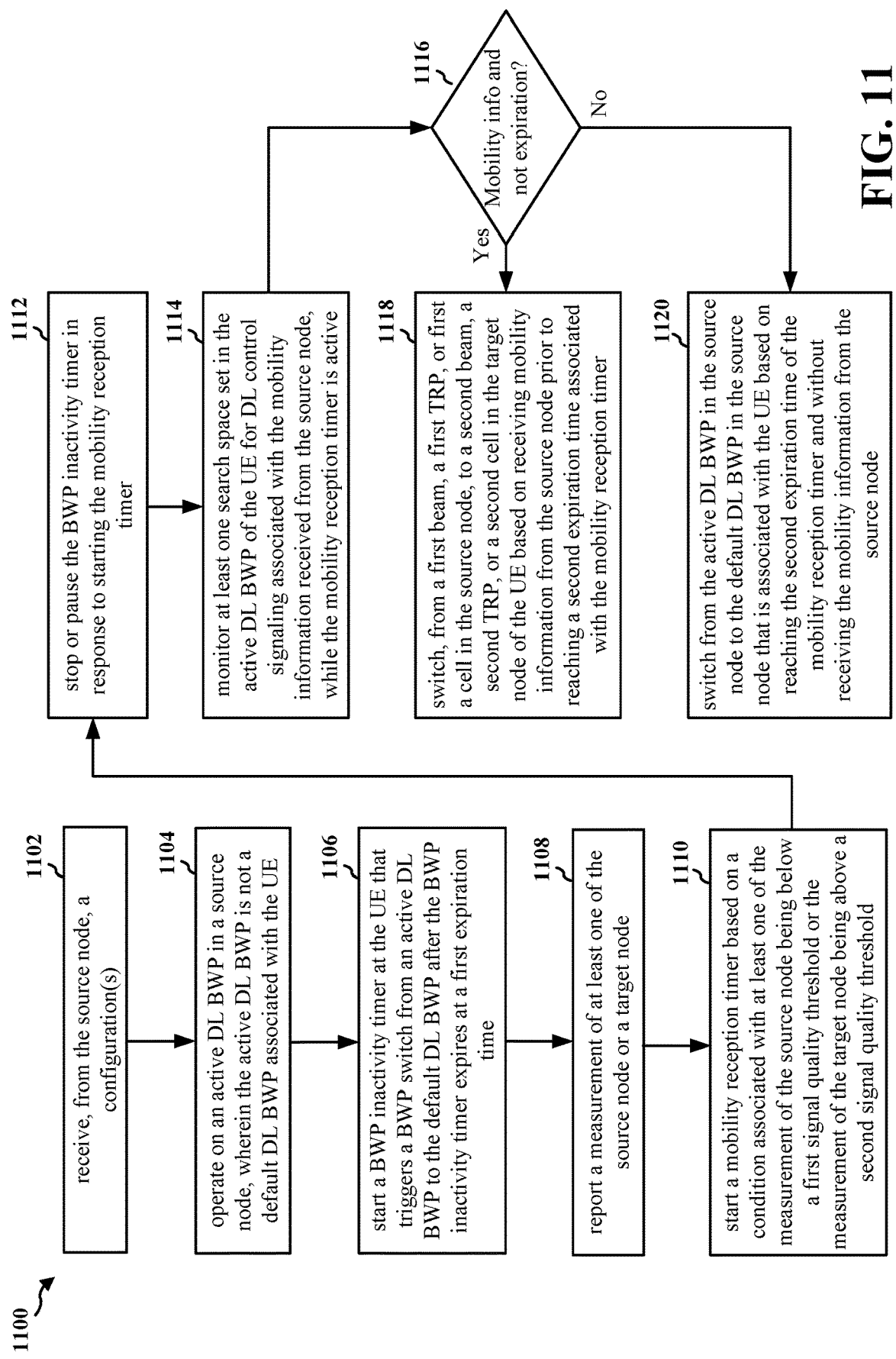
FIG. 11 is a flowchart of a method of wireless communication, in accordance with various aspects of the present disclosure.

FIG. 11 is a flowchart 1100 of a method of wireless communication. The method may be performed by a UE (e.g., the UE 104, 602, 902; the apparatus 1704). At 1102, the UE may be configured to receive, from the source node, a configuration(s). In some aspects, 1102 may be performed by the component 198. For instance, with reference to FIG. 6, the UE 602 may be configured to receive, from the source node 604, a configuration(s) 606. In aspects, the configurations 606 may be received by the UE 602, as transmitted by the source node 604, via DCI, RRC signaling, and/or the like. The configurations 606 may include, without limitation, a configuration for at least one of an active DL BWP, a default DL BWP, a BWP inactivity timer, a first expiration time of the BWP inactivity timer, a mobility reception timer, a second expiration time of the mobility reception timer, one or more measurement objects, a transmission and resource allocation scheme for the measurement reporting, a first number of monitoring occasions for a search space set and a DL control signaling format before the mobility reception timer starts, a second number of monitoring occasions for the search space set and the DL control signaling format after the mobility reception timer starts, a scrambling sequence for the DL control signaling or mobility information, an identifier for the UE or a UE group including the UE, a transmission and resource allocation scheme for UE assistance information, a first signal quality threshold of the source node, a second signal quality threshold of the target node, a reporting resource, an adjusted first expiration time, etc. In aspects, examples of a transmission scheme may include, without limitation, a modulation and coding scheme (MCS), number of MIMO layers, a TB size, an aggregation factor for PDSCH, an aggregation level for PDCCH, a number of repetitions for PDCCH/PDSCH, demodulation reference signal (DMRS) bundling for PDCCH/PDSCH, a redundancy version of PDSCH, a cyclic redundancy check (CRC) attachment scheme for PDCCH/PDSCH, scheduling and mapping granularity for PDCCH/PDSCH (e.g., slot based, sub-slot based), and/or the like. In aspects, examples of resource allocation may include, without limitation, a number of RBs, a number of symbols, a number of slots, a density of DMRS for PDSCH/PDCCH, and/or the like.

At 1104, the UE is configured to operate on an active DL BWP in a source node, where the active DL BWP is not a default DL BWP associated with the UE. In some aspects, 1104 may be performed by the component 198. For instance, with reference to FIGS. 6, and 5, the UE 602 may be configured to operate on an active DL BWP (e.g., as in slot m+2 in FIG. 5; as shown at 610 in FIG. 6) in a source node 604, where the active DL BWP is not the default DL BWP (e.g., as in slot n+2 in FIG. 5).

At 1106, the UE may be configured to start a BWP inactivity timer at the UE that triggers a BWP switch from an active DL BWP to the default DL BWP after the BWP inactivity timer expires at a first expiration time. In some aspects, 1106 may be performed by the component 198. For instance, with reference to FIGS. 6, and 7, 8, the UE 602 may be configured to start, at 610 (e.g., t0 in FIG. 7; tA in FIG. 8), a BWP inactivity timer at the UE 602 that may trigger a BWP switch from an active DL BWP (e.g., a wider BWP) to the default DL BWP (e.g., a narrower BWP) after the BWP inactivity timer expires at a first expiration time (e.g., t0+T0 in FIG. 7; tB in FIG. 8). In aspects, the BWP inactivity timer may be configured with an expiration time (e.g., t0+T0 in FIG. 7; tB in FIG. 8) before which the UE may be configured to monitor the active DL BWP for mobility information prior to switching back to the default (e.g., narrower) DL BWP or to perform a mobility operation with respect to the target node 605.

At 1108, the UE may be configured to report a measurement of at least one of the source node or a target node. In some aspects, 1108 may be performed by the component 198. For instance, with reference to FIG. 6, the UE 602 may be configured to make a measurement(s) 612 that correspond the source node 604 and/or the target node 605 based on the signaling 608, where the measurement(s) 612 may be associated with UE mobility operations. the UE 602 may be configured to transmit to the source node 604 the measurement(s) 612, which may include more than one measurement, in aspects. For example, the UE 602 may transmit or report a measurement of at least one of the source node 604 or the target node 605 to the source node 604.

At 1110, the UE may be configured to start a mobility reception timer based on a condition associated with at least one of the first measurement of the source node being below a first signal quality threshold or the second measurement of the target node being above a second signal quality threshold. In some aspects, 1110 may be performed by the component 198. For instance, with reference to FIGS. 6, 7, the UE 602 may be configured to start, at 614, a mobility reception timer based on a condition associated with the measurement(s) 612 of the source node 604 being below a first signal quality threshold and/or the measurement(s) 612 of the target node 605 being above a second signal quality threshold. For example, if the measurement(s) 612 of the source node 604 is/are lower than a configured signal quality threshold and/or if the measurement(s) 612 of the target node 605 is/are above another configured signal quality threshold, the UE 602 may be configured to start, at 614 (e.g., tA in FIGS. 7, 8), the mobility reception timer having an expiration time (e.g., tA+tW in FIG. 7, 8) by which the UE 602 may be configured to monitor the active DL BWP for mobility information prior to switching back to the default (e.g., narrower) DL BWP or to perform the mobility operation with respect to the target node 605. That is, the mobility reception timer may enable the UE 602 to monitor for the mobility information (e.g., to wait to receive the mobility information) longer than the BWP inactivity timer may allow (e.g., based on the latency for mobility operations noted above). In aspects, the UE 602 may be configured to start the mobility reception timer (e.g., at 614 in FIG. 6; tA in FIGS. 7, 8) before the BWP inactivity timer expires at its first expiration time (e.g., t0+T0 in FIG. 7; tB in FIG. 8) based at least on determining a time duration between a time of reporting the measurement and the first expiration time of the BWP inactivity timer (e.g., before the adjustment of the BWP inactivity expiration time) is lower than a pre-configured threshold for the mobility reception timer, where the BWP inactivity timer may be associated with a first time window configuration for the UE 602 to receive control and data information that is unicast or multicast to the UE 602, and the mobility reception timer may be associated with a second time window configuration for the UE 602 to receive the mobility information associated with the UE 602 or a UE group of which the UE 602 is a part.

At 1112, the UE may be configured to stop or pause the BWP inactivity timer in response to starting the mobility reception timer. In some aspects, 1112 may be performed by the component 198. For instance, with reference to FIGS. 6, 7, the UE 602 may be configured to, at 616 (e.g., tA in FIG. 7), stop/pause the BWP inactivity timer, based on starting the mobility reception timer (e.g., at 614 in FIG. 6; tA in FIG. 7), in various aspects. In one aspect, the UE 602 may be configured to stop or pause the BWP inactivity timer (e.g., tA in FIG. 7) while the mobility reception timer runs, thus providing the UE 602 additional time to monitor/receive the mobility information based on the mobility reception timer. The UE 602 may be further configured to restart the BWP inactivity timer after starting the mobility reception timer (e.g., tA+T−T0 in FIG. 7), where the restarted BWP inactivity timer is associated with an adjusted first expiration time (e.g., tA+T in FIG. 7).

At 1114, the UE may be configured to monitor at least one search space set in the active DL BWP of the UE for DL control signaling associated with the mobility information received from the source node, while the mobility reception timer is active. In some aspects, 1114 may be performed by the component 198. For instance, with reference to FIGS. 6, 7, the UE 602 may be configured to monitor the active DL BWP for mobility information prior to switching back to the default (e.g., narrower) DL BWP or to perform the mobility operation with respect to the target node 605. That is, the mobility reception timer may enable the UE 602 to monitor for the mobility information (e.g., to wait to receive the mobility information) longer than the BWP inactivity timer may allow (e.g., based on the latency for mobility operations noted above). In one aspect, the UE 602 may be configured to stop or pause the BWP inactivity timer (e.g., tA in FIG. 7) while the mobility reception timer runs, thus providing the UE 602 additional time to monitor/receive the mobility information based on the mobility reception timer. For example, the UE 602 may be configured to monitor at least one search space set in the active DL BWP of the UE 602 for DL control signaling associated with the mobility information received from the source node 604, while the mobility reception timer is active. In aspects, the UE 602 may be configured to monitor at least one search space set of DL control signaling received from the source node 604 for the mobility information by reducing a number of monitoring occasions for the DL control signaling subsequent to starting the mobility reception timer, based at least on a pre-configured rule (e.g., a hard coded rule, or a rule configured by the network), a reduction configuration from the source node 604, UE assistance information (UAI) for power saving (e.g., may be transmitted from the UE 602 to the source node 604 before the mobility reception timer starts (e.g., tA in FIG. 7)), or a hybrid thereof. In aspects, the search space set(s) associated with mobility information reception may include one or more of a common search space (CSS) set or a UE-specific search space (USS) set configuration, an identifier for the UE or a UE group including the UE, a DL control signaling format configured for PDCCH ordered timing advance or mobility procedure, or a combination thereof.

At 1116, the UE may be configured to determine if the mobility information was received from the source node during the monitoring of the at least one search space set in the active DL BWP of the UE for DL control signaling while the mobility reception timer is active. In some aspects, 1116 may be performed by the component 198. For instance, with reference to FIGS. 6, 7, the UE 602 may be configured to determine if the mobility information was received from the source node 604 prior to the mobility reception timer expiring (e.g., at tA+tW in FIG. 7). If so, flowchart 1100 continues to 1118, and if not, flowchart 1100 continues to 1120.

At 1118, the UE may be configured to switch, from a first beam, a first TRP, or first a cell in the source node, to a second beam, a second TRP, or a second cell in the target node of the UE based on receiving mobility information from the source node prior to reaching a second expiration time associated with the mobility reception timer. In some aspects, 1118 may be performed by the component 198. For instance, with reference to FIGS. 6, 7, the UE 602 may be configured to at 618, switch to a beam or a cell associated with the UE 602 for the target node 605 based on mobility information from the source node 604 and prior to reaching the mobility expiration time (e.g., at tA+tW in FIG. 7) associated with the mobility reception timer.

At 1120, the UE may be configured to switch from the active DL BWP in the source node to the default DL BWP in the source node that is associated with the UE based on reaching the second expiration time of the mobility reception timer and without receiving the mobility information from the source node. In some aspects, 1120 may be performed by the component 198. For instance, with reference to FIGS. 6, 7, the UE 602 may be configured to switch to the default downlink BWP that is associated with the UE 602 based on reaching the mobility expiration time (e.g., at tA+tW in FIG. 7) without receiving the mobility information from the source node 604.

Figure 12:
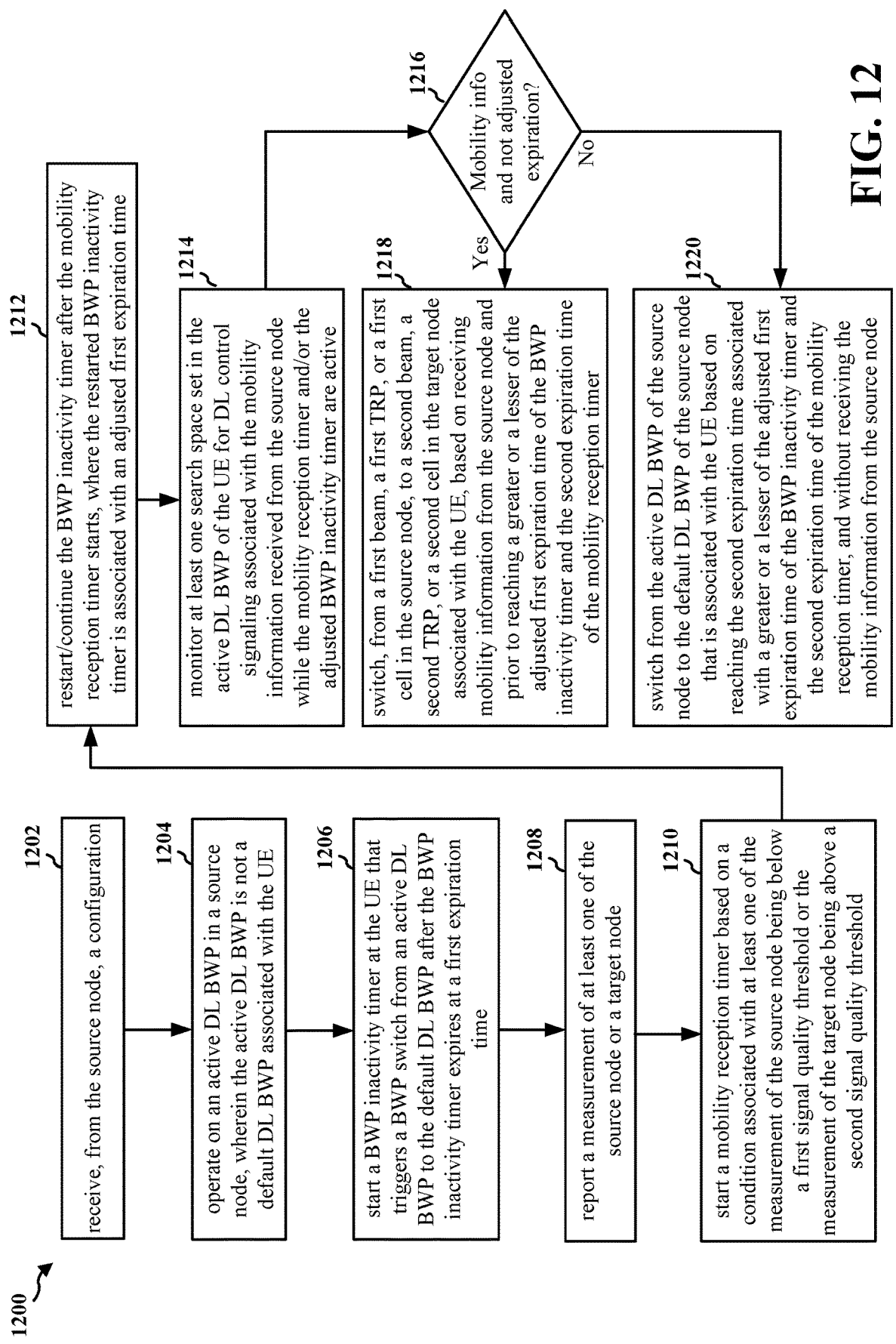
FIG. 12 is a flowchart of a method of wireless communication, in accordance with various aspects of the present disclosure.

FIG. 12 is a flowchart 1200 of a method of wireless communication. The method may be performed by a UE (e.g., the UE 104, 602, 902; the apparatus 1704). At 1202, the UE may be configured to receive, from the source node, a configuration(s). In some aspects, 1202 may be performed by the component 198. For instance, with reference to FIG. 6, the UE 602 may be configured to receive, from the source node 604, a configuration(s) 606. In aspects, the configurations 606 may be received by the UE 602, as transmitted by the source node 604, via DCI, RRC signaling, and/or the like. The configurations 606 may include, without limitation, a configuration for at least one of an active DL BWP, a default DL BWP, a BWP inactivity timer, a first expiration time of the BWP inactivity timer, a mobility reception timer, a second expiration time of the mobility reception timer, one or more measurement objects, a transmission and resource allocation scheme for the measurement reporting, a first number of monitoring occasions for a search space set and a DL control signaling format before the mobility reception timer starts, a second number of monitoring occasions for the search space set and the DL control signaling format after the mobility reception timer starts, a scrambling sequence for the DL control signaling or mobility information, an identifier for the UE or a UE group including the UE, a transmission and resource allocation scheme for UE assistance information, a first signal quality threshold of the source node, a second signal quality threshold of the target node, a reporting resource, an adjusted first expiration time, etc. In aspects, examples of a transmission scheme may include, without limitation, a modulation and coding scheme (MCS), number of MIMO layers, a TB size, an aggregation factor for PDSCH, an aggregation level for PDCCH, a number of repetitions for PDCCH/PDSCH, demodulation reference signal (DMRS) (bundling for PDCCH/PDSCH, a redundancy version of PDSCH, a cyclic redundancy check (CRC) attachment scheme for PDCCH/PDSCH, scheduling and mapping granularity for PDCCH/PDSCH (e.g., slot based, sub-slot based), and/or the like. In aspects, examples of resource allocation may include, without limitation, a number of RBs, a number of symbols, a number of slots, a density of DMRS for PDSCH/PDCCH, and/or the like.

At 1204, the UE is configured to operate on an active DL BWP in a source node, where the active DL BWP is not a default DL BWP associated with the UE. In some aspects, 1204 may be performed by the component 198. For instance, with reference to FIGS. 6, and 5, the UE 602 may be configured to operate on an active DL BWP (e.g., as in slot m+2 in FIG. 5; as shown at 610 in FIG. 6) in a source node 604, where the active DL BWP is not the default DL BWP (e.g., as in slot n+2 in FIG. 5).

At 1206, the UE may be configured to start a BWP inactivity timer at the UE that triggers a BWP switch from an active DL BWP to the default DL BWP after the BWP inactivity timer expires at a first expiration time. In some aspects, 1206 may be performed by the component 198. For instance, with reference to FIGS. 6, and 7, 8, the UE 602 may be configured to start, at 610 (e.g., t0 in FIG. 7; tA in FIG. 8), a BWP inactivity timer at the UE 602 that may trigger a BWP switch from an active DL BWP (e.g., a wider BWP) to the default DL BWP (e.g., a narrower BWP) after the BWP inactivity timer expires at a first expiration time (e.g., t0+T0 in FIG. 7; tB in FIG. 8). In aspects, the BWP inactivity timer may be configured with an expiration time (e.g., t0+T0 in FIG. 7; tB in FIG. 8) before which the UE may be configured to monitor the active DL BWP for mobility information prior to switching back to the default (e.g., narrower) DL BWP or to perform a mobility operation with respect to the target node 605.

At 1208, the UE may be configured to report a measurement of at least one of the source node or a target node. In some aspects, 1208 may be performed by the component 198. For instance, with reference to FIG. 6, the UE 602 may be configured to make a measurement(s) 612 that correspond the source node 604 and/or the target node 605 based on the signaling 608, where the measurement(s) 612 may be associated with UE mobility operations. the UE 602 may be configured to transmit to the source node 604 the measurement(s) 612, which may include more than one measurement, in aspects. For example, the UE 602 may transmit or report a measurement of at least one of the source node 604 or the target node 605 to the source node 604.

At 1210, the UE may be configured to start a mobility reception timer based on a condition associated with at least one of the first measurement of the source node being below a first signal quality threshold or the second measurement of the target node being above a second signal quality threshold. In some aspects, 1210 may be performed by the component 198. For instance, with reference to FIGS. 6, 7, the UE 602 may be configured to start, at 614, a mobility reception timer based on a condition associated with the measurement(s) 612 of the source node 604 being below a first signal quality threshold and/or the measurement(s) 612 of the target node 605 being above a second signal quality threshold. For example, if the measurement(s) 612 of the source node 604 is/are lower than a configured signal quality threshold and/or if the measurement(s) 612 of the target node 605 is/are above another configured signal quality threshold, the UE 602 may be configured to start, at 614 (e.g., tA in FIGS. 7, 8), the mobility reception timer having an expiration time (e.g., tA+tW in FIGS. 7, 8) by which the UE 602 may be configured to monitor the active DL BWP for mobility information prior to switching back to the default (e.g., narrower) DL BWP or to perform the mobility operation with respect to the target node 605. That is, the mobility reception timer may enable the UE 602 to monitor for the mobility information (e.g., to wait to receive the mobility information) longer than the BWP inactivity timer may allow (e.g., based on the latency for mobility operations noted above). In aspects, the UE 602 may be configured to start the mobility reception timer (e.g., at 614 in FIG. 6; tA in FIGS. 7, 8) before the BWP inactivity timer expires at its first expiration time (e.g., t0+T0 in FIG. 7; tB in FIG. 8) based at least on determining a time duration between a time of reporting the measurement and the first expiration time of the BWP inactivity timer (e.g., before the adjustment of the BWP inactivity expiration time) is lower than a pre-configured threshold for the mobility reception timer, where the BWP inactivity timer may be associated with a first time window configuration for the UE 602 to receive control and data information that is unicast or multicast to the UE 602, and the mobility reception timer may be associated with a second time window configuration for the UE 602 to receive the mobility information associated with the UE 602 or a UE group of which the UE 602 is a part.

At 1212, the UE may be configured to restart/continue the BWP inactivity timer after the mobility reception timer starts, where the restarted BWP inactivity timer is associated with an adjusted first expiration time. In some aspects, 1212 may be performed by the component 198. For instance, with reference to FIGS. 6, 8, the UE 602 may be configured to, at 616 (e.g., tA in FIG. 8), continue/restart the BWP inactivity timer, based on starting the mobility reception timer (e.g., at 614 in FIG. 6; tA in FIG. 8), in various aspects. In one aspect, the UE 602 may be configured to continue running or to restart (e.g., tA in FIG. 8) the BWP inactivity timer while the mobility reception timer runs, thus providing the UE 602 additional time to monitor/receive the mobility information based on the mobility reception timer and/or an adjusted expiration time of the BWP inactivity timer. In one example, the UE 602 may be further configured to restart the BWP inactivity timer (e.g., tA in FIG. 8) after starting the mobility reception timer, where the restarted BWP inactivity timer is associated with an adjusted first expiration time (e.g., tB+0.5T, tB+T in FIG. 8). In aspects, the adjusted first expiration time may be an integer multiple, or a portion of, the first expiration time. For example, before the UE 602 starts the mobility reception timer Y configured with the expiration time tW, the UE 602 may be configured to determine (1) that the BWP inactivity timer X may expire at time tB if it is not re-started/paused/stopped by the UE 602 after time tA, and (2) that the gap between tA and tB may be less than a pre-configured threshold tW0 (e.g., where tB−tA<tW0), which may be the same value, or a similar value, as the expiration time of the mobility reception timer Y (e.g., tW0=tW), and (3) a termination time tk for DL signaling (e.g., PDCCH) monitoring in the active DL BWP of the source node(s), where tk may be defined as a function of the BWP inactivity timer X and/or the mobility reception timer Y. As examples, but without limitation, tk may be defined as the max(tB+k*T0, tA+tW), where k>0 and k is a parameter pre-configured by the source node(s), tk may be defined as the min(tB+k*T0, tA+tW), where k>0 and k is a parameter pre-configured by the source node(s), and/or the like. In aspects, as noted above, the UE 602 may be configured to restart the BWP inactivity timer, where the restarted BWP inactivity timer is associated with an adjusted expiration time tk, e.g., based on the parameter k, such that the adjusted first expiration time may be an integer multiple of the expiration time, e.g., tB+T for k=1, or a portion of the expiration time, e.g., tB+0.5*T for k=0.5.

At 1214, the UE may be configured to monitor at least one search space set in the active DL BWP of the UE for DL control signaling associated with the mobility information received from the source node while the mobility reception timer and/or the adjusted BWP inactivity timer are active. In some aspects, 1214 may be performed by the component 198. For instance, with reference to FIGS. 6, 8, the UE 602 may be configured to monitor the active DL BWP for mobility information prior to the range of tk expiring. The UE 602 may be configured to determine (1) that the BWP inactivity timer X may expire at time tB if it is not re-started/paused/stopped by the UE after time tA, and (2) that the gap between tA and B may be less than a pre-configured threshold tW0 (e.g., where tB−tA<tW0), which may be the same value, or a similar value, as the expiration time of the mobility reception timer Y (e.g., tW0=tW), and (3) a termination time tk for DL signaling (e.g., PDCCH) monitoring in the active DL BWP of the source node(s) 604, where tk may be defined as a function of the BWP inactivity timer X and/or the mobility reception timer Y. As examples, but without limitation, tk may be defined as a range, e.g., the max(tB+k*T0, tA+tW), where k>0 and k is a parameter pre-configured by the source node(s) 604, as the min(tB+k*T0, tA+tW), where k>0 and k is a parameter pre-configured by the source node(s) 604, and/or the like. In aspects, as noted above, the UE may be configured to restart the BWP inactivity timer (at tA in FIG. 8), where the restarted BWP inactivity timer is associated with an adjusted expiration time tk, e.g., based on the parameter k, such that the adjusted first expiration time may be an integer multiple of the expiration time, e.g., tB+T for k=1, or a portion of the expiration time, e.g., tB+0.5*T for k=0.5. The mobility reception timer and the adjust BWP inactivity timer may enable the UE 602 to monitor for the mobility information (e.g., to wait to receive the mobility information) longer than the originally configured BWP inactivity timer may allow (e.g., based on the latency for mobility operations noted above).

At time epoch tA, the UE 602 may be configured to perform one or more procedures when operating in the active DL BWP of source node(s) 604, e.g., re-starting the BWP inactivity timer X, starting the mobility reception timer Y for receiving mobility-related DCI or RRC messaging (e.g., CHO conditions, commands for HO or beam switching, etc.), where the mobility reception timer Y may be configured with an expiration time tW by the network, e.g., the source node(s) 604. The UE 602 may be configured to then continue monitoring DL signaling, e.g., PDCCH, (for mobility-related DCI, or DCI scheduling mobility-related RRC messaging, etc.) in USS/CSS resource sets after the BWP inactivity timer X and/or the mobility reception timer Y is/are re-started/started and before tk expires. After the UE 602 starts the mobility reception timer Y, the UE 602 may be configured to reduce the number of DL signaling (e.g., PUCCH) monitoring occasions in the active DL BWP based on the UE capabilities, hardcoded rules, and/or rules configured by the source node(s) 604. If the UE 602 receives the mobility-related DCI or RRC messaging on/before tk expires, the UE may be configured to follow the DCI or RRC signaling for beam/cell switching from the source node(s) 604 to the target node(s) 605, which may be addressed to the UE 602 identifier (e.g., C-RNTI, MCS-RNTI, etc.) or a group RNTI (e.g., group-based HO or beam switching commands) configured for the UE 602 by the source node(s) 604. Otherwise, the UE may be configured to switch to the default DL BWP of the source node 604 after tk and stop the BWP inactivity timer X and/or the mobility reception timer Y.

At 1216, the UE may be configured to determine if the mobility information was received from the source node during the monitoring of the at least one search space set in the active DL BWP of the UE for DL control signaling while the mobility reception timer and the adjusted BWP inactivity timer are active. In some aspects, 1216 may be performed by the component 198. For instance, with reference to FIGS. 6, 8, the UE 602 may be configured to determine if the mobility information was received from the source node 604 prior to the mobility reception timer expiring (e.g., at tA+tW in FIG. 8) and prior to the adjusted BWP inactivity timer expiring (e.g., the range of tk in FIG. 8). If so, flowchart 1200 continues to 1218, and if not, flowchart 1200 continues to 1220.

At 1218, the UE may be configured to switch, from a first beam, a first TRP, or a first cell in the source node, to a second beam, a second TRP, or a second cell in the target node associated with the UE, based on receiving mobility information from the source node and prior to reaching a greater or a lesser of the adjusted first expiration time of the BWP inactivity timer and the second expiration time of the mobility reception timer. In some aspects, 1218 may be performed by the component 198. For instance, with reference to FIGS. 6, 8, the UE 602 may be configured to at 618, switch to a beam or a cell associated with the UE 602 for the target node 605 based on mobility information from the source node 604 and prior to reaching the mobility expiration time (e.g., at tA+tW in FIG. 8) associated with the mobility reception timer and the adjusted BWP inactivity expiration time (e.g., the range of tk in FIG. 8) associated with the BWP inactivity timer.

At 1220, the UE may be configured to switch from the active DL BWP of the source node to the default DL BWP of the source node that is associated with the UE based on reaching the second expiration time associated with a greater or a lesser of the adjusted first expiration time of the BWP inactivity timer and the second expiration time of the mobility reception timer, and without receiving the mobility information from the source node. In some aspects, 1220 may be performed by the component 198. For instance, with reference to FIGS. 6, 8, the UE 602 may be configured to switch to the default downlink BWP that is associated with the UE 602 based on reaching the mobility expiration time (e.g., at tA+tW in FIG. 8) and adjusted BWP inactivity expiration time (e.g., the range of tk in FIG. 8) associated with the BWP inactivity timer without receiving the mobility information from the source node 604.

Figure 13:
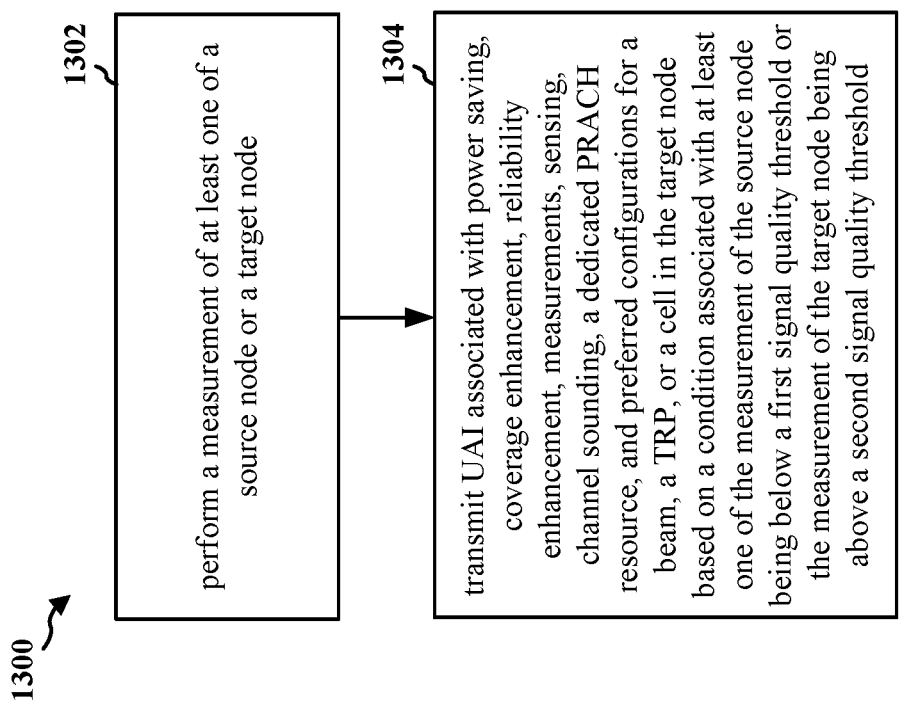
FIG. 13 is a flowchart of a method of wireless communication, in accordance with various aspects of the present disclosure.

FIG. 13 is a flowchart 1300 of a method of wireless communication. The method may be performed by a UE (e.g., the UE 104, 602, 902; the apparatus 1704). At 1302, the UE is configured to perform a measurement of at least one of a source node or a target node. In some aspects, 1302 may be performed by the component 198. For instance, with reference to FIG. 6, the UE 602 may be configured to receive, from the source node 904 and/or the target node 905, signaling 908. The UE 902 may be configured to make a measurement(s) 910 that correspond the source node 904 and/or the target node 905 based on the signaling 908, where the measurement(s) 910 may be associated with UE mobility operations. The UE 902 may be configured to transmit to the source node 904 the measurement(s) 910, which may include more than one measurement, in aspects. For example, the UE 902 may transmit or report a measurement of at least one of the source node 904 or the target node 905 to the source node 904.

At 1304, the UE is configured transmit UAI associated with power saving, coverage enhancement, reliability enhancement, measurements, sensing, channel sounding, a dedicated PRACH resource, and preferred configurations for a beam, a TRP, or a cell in the target node based on a condition associated with at least one of the first measurement of the source node being below a first signal quality threshold or the second measurement of the target node being above a second signal quality threshold.

In some aspects, 1304 may be performed by the component 198. For instance, with reference to FIG. 9, the UE 902 may be configured to transmit UAI 912 to the source node 904. In aspects, the UAI 912 may be transmitted to the source node 904 via a valid UL resource at the UE or via multiplexing with at least one of the measurement of the source node or the measurement of the target node (e.g., the measurement(s) 910) prior to an earliest expiration associated with at least one of a BWP inactivity timer or a mobility reception timer, as described herein. The UAI 912 may include a status for timer information, in aspects, such as, but not limited to, an earliest expiration of at least one of the BWP inactivity timer or the mobility reception timer, an indication of a stop, a pause, or a start/re-start of at least one of the BWP inactivity timer or the mobility reception timer, etc. The UAI may include a request(s), in aspects, such as but not limited to, a request for mobility enhancement at the UE, e.g., (1) a coverage or reliability enhancement of mobility-related DCI or RRC signaling, (2) a measurement enhancement associated with additional measurement opportunities or increased accuracy, (3) one or more of a channel sounding enhancement or a RACH enhancement for at least one of a link recovery, a beam failure recovery, or an RRC re-establishment, (4) a dedicated PRACH resource, and/or the like.

In aspects, the coverage or reliability enhancement may be associated with at least one of an aggregation level, repetitions of a CORESET, a slot aggregation, TB repetitions, a scaling factor for the DCI or TBs, a DMRS bundling scheme, an additional DMRS configuration, frequency hopping, PRB interleaving, a MCS adaptation, a waveform adaptation, or a power adaptation. In aspects, the measurement enhancement may be associated with at least one of requests for aperiodic and on-demand transmission of a beam-formed DL RS, where the beam-formed DL RS is at least one of a NCD-SSB, CSI-RS, a TRS, or another DL RS in the source node or the target node. In aspects, the channel sounding enhancement or the RACH enhancement may be associated with an on-demand allocation of channel sounding RS or PRACH resources for a prioritized random access procedure, and the PRACH may be configured in an UL BWP associated with the default DL BWP or the active DL BWP for the UE 902.

In some aspects, there may be conditions present by which the UE 902 is triggered to transmit the UAI 912 to the source node 904 for mobility enhancement. For example, and without limitation, the UE 902 may have obtained its measurements (e.g., RRM) of source node (e.g., cell, TRP, etc.), or target node(s), the measurements of the source node may be below a set of pre-configured UAI signal quality thresholds (Q's), and/or the measurements of at least one target node may be above a set of pre-configured UAI signal quality thresholds (Q'n), and the UE 902 is configured with a valid UL resource or to multiplex the UAI 912 and the measurement(s) 910 before an earliest expiration of at least one of the BWP inactivity timer or the mobility reception timer.

Figure 14:
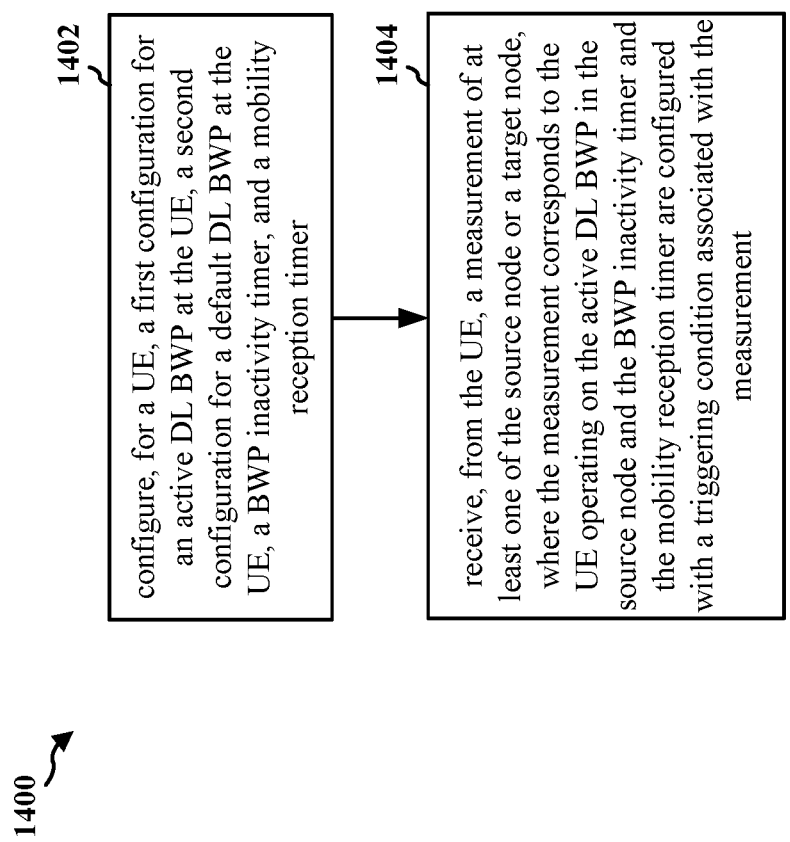
FIG. 14 is a flowchart of a method of wireless communication, in accordance with various aspects of the present disclosure.

FIG. 14 is a flowchart 1400 of a method of wireless communication. The method may be performed by a base station (e.g., the base station 102; the source node 604, 904; the network entity 1702, 1802, _1260. At 1402, the base station is configured to configure, for a UE, a first configuration for an active DL BWP at the UE, a second configuration for a default DL BWP at the UE, a BWP inactivity timer, and a mobility reception timer. In some aspects, 1402 may be performed by the component 199. For instance, with reference to FIG. 6, the source node 604 may be configured to provide, for the UE 602, one or more configurations 606. In aspects, the configurations 606 may be received by the UE 602, as transmitted/provided by the source node 604, via DCI, RRC signaling, and/or the like. The configurations 606 may include, without limitation, a configuration for at least one of an active DL BWP, a default DL BWP, a BWP inactivity timer, a first expiration time of the BWP inactivity timer, a mobility reception timer, a second expiration time of the mobility reception timer, one or more measurement objects, a transmission and resource allocation scheme for the measurement reporting, a first number of monitoring occasions for a search space set and a DL control signaling format before the mobility reception timer starts, a second number of monitoring occasions for the search space set and the DL control signaling format after the mobility reception timer starts, a scrambling sequence for the DL control signaling or mobility information, an identifier for the UE 602 or a UE group including the UE 602, a transmission and resource allocation scheme for UE assistance information, a first signal quality threshold of the source node, a second signal quality threshold of the target node, a reporting resource, an adjusted first expiration time, etc. In aspects, examples of a transmission scheme may include, without limitation, a MCS, number of MIMO layers, a TB size, an aggregation factor for PDSCH, an aggregation level for PDCCH, a number of repetitions for PDCCH/PDSCH, DMRS bundling for PDCCH/PDSCH, a redundancy version of PDSCH, a CRC attachment scheme for PDCCH/PDSCH, scheduling and mapping granularity for PDCCH/PDSCH (e.g., slot based, sub-slot based), and/or the like. In aspects, examples of resource allocation may include, without limitation, a number of RBs, a number of symbols, a number of slots, a density of DMRS for PDSCH/PDCCH, and/or the like.

At 1404, the base station is configured to receive, from the UE, a measurement of at least one of the source node or a target node, where the measurement corresponds to the UE operating on the active DL BWP in the source node and the BWP inactivity timer and the mobility reception timer are configured with a triggering condition associated with the measurement. In some aspects, 1404 may be performed by the component 199. For instance, with reference to FIG. 6, the source node 604 (and/or the target node 605) may be configured to provide/transmit to the UE 602 signaling 608. The UE 602 may be configured to make a measurement(s) 612, described below, that correspond the source node 604 and/or the target node 605 based on the signaling 608, where the measurement(s) 612 may be associated with UE mobility operations. The source node 604 may receive, as transmitted by the UE 602, the measurement(s) 612, which may include more than one measurement, in aspects. For example, the UE 602 may transmit or report a measurement of at least one of the source node 604 or the target node 605 to be received by the source node 604.

Figure 15:
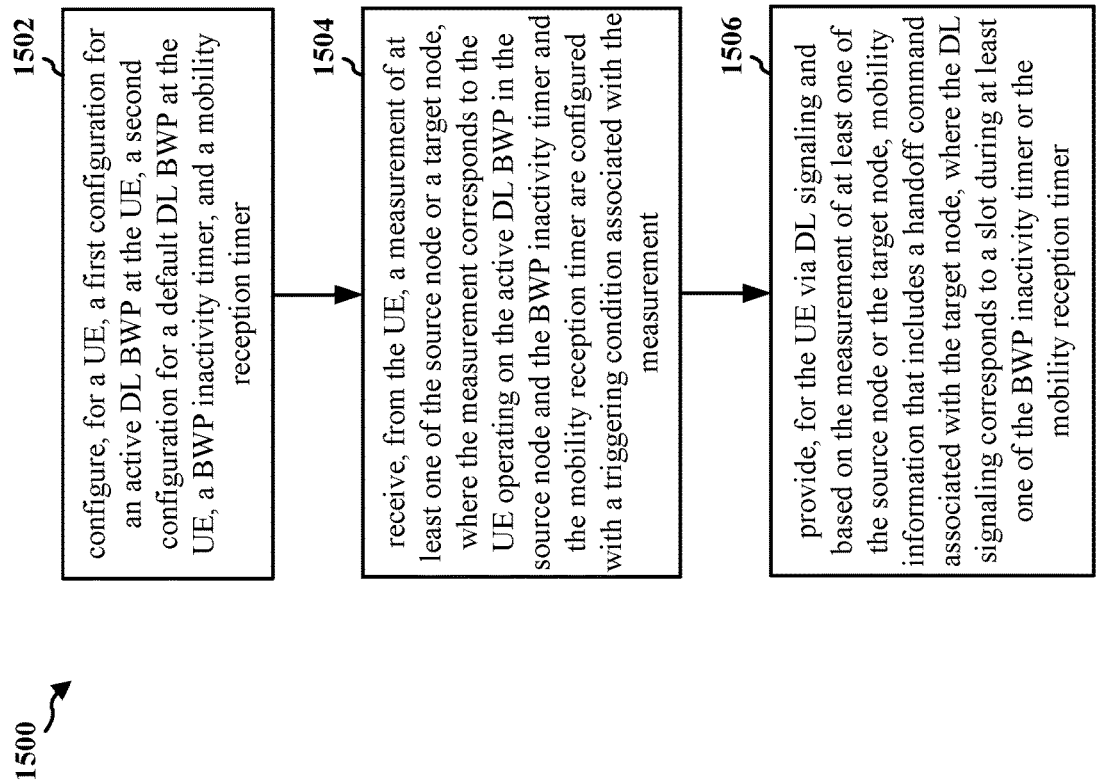
FIG. 15 is a flowchart of a method of wireless communication, in accordance with various aspects of the present disclosure.

FIG. 15 is a flowchart 1500 of a method of wireless communication. The method may be performed by a base station (e.g., the base station 102; the source node 604, 904; the network entity 1702, 1802, _1260. At 1502, the base station is configured to configure, for a UE, a first configuration for an active DL BWP at the UE, a second configuration for a default DL BWP at the UE, a BWP inactivity timer, and a mobility reception timer. In some aspects, 1502 may be performed by the component 199. For instance, with reference to FIG. 6, the source node 604 may be configured to provide, for the UE 602, one or more configurations 606. In aspects, the configurations 606 may be received by the UE 602, as transmitted/provided by the source node 604, via DCI, RRC signaling, and/or the like. The configurations 606 may include, without limitation, a configuration for at least one of an active DL BWP, a default DL BWP, a BWP inactivity timer, a first expiration time of the BWP inactivity timer, a mobility reception timer, a second expiration time of the mobility reception timer, one or more measurement objects, a transmission and resource allocation scheme for the measurement reporting, a first number of monitoring occasions for a search space set and a DL control signaling format before the mobility reception timer starts, a second number of monitoring occasions for the search space set and the DL control signaling format after the mobility reception timer starts, a scrambling sequence for the DL control signaling or mobility information, an identifier for the UE 602 or a UE group including the UE 602, a transmission and resource allocation scheme for UE assistance information, a first signal quality threshold of the source node, a second signal quality threshold of the target node, a reporting resource, an adjusted first expiration time, etc. In aspects, examples of a transmission scheme may include, without limitation, a MCS, number of MIMO layers, a TB size, an aggregation factor for PDSCH, an aggregation level for PDCCH, a number of repetitions for PDCCH/PDSCH, DMRS bundling for PDCCH/PDSCH, a redundancy version of PDSCH, a CRC attachment scheme for PDCCH/PDSCH, scheduling and mapping granularity for PDCCH/PDSCH (e.g., slot based, sub-slot based), and/or the like. In aspects, examples of resource allocation may include, without limitation, a number of RBs, a number of symbols, a number of slots, a density of DMRS for PDSCH/PDCCH, and/or the like.

At 1504, the base station is configured to receive, from the UE, a measurement of at least one of the source node or a target node, where the measurement corresponds to the UE operating on the active DL BWP in the source node and the BWP inactivity timer and the mobility reception timer are configured with a triggering condition associated with the measurement. In some aspects, 1504 may be performed by the component 199. For instance, with reference to FIG. 6, the source node 604 (and/or the target node 605) may be configured to provide/transmit to the UE 602 signaling 608. The UE 602 may be configured to make a measurement(s) 612, described below, that correspond the source node 604 and/or the target node 605 based on the signaling 608, where the measurement(s) 612 may be associated with UE mobility operations. The source node 604 may receive, as transmitted by the UE 602, the measurement(s) 612, which may include more than one measurement, in aspects. For example, the UE 602 may transmit or report a measurement of at least one of the source node 604 or the target node 605 to be received by the source node 604.

At 1506, the base station is configured to provide, for the UE via DL signaling and based on the measurement of at least one of the source node or the target node, mobility information that includes a handoff command associated with the target node, where the DL signaling corresponds to a slot during at least one of the BWP inactivity timer or the mobility reception timer. In some aspects, 1506 may be performed by the component 199. For instance, with reference to FIGS. 6, 7, 8, the source node 604 may be configured to provide, for the UE 602 via DL signaling and based on the measurement(s) 612 of at least one of the source node 604 or the target node 605, mobility information that includes a handoff command associated with the target node 605. In aspects, where the DL signaling corresponds to a slot during at least one of the BWP inactivity timer (e.g., t0+T0, tA+T in FIG. 7; tB+0.5*T, tB+T for the range of tk in FIG. 8) or the mobility reception timer (tA+tW in FIGS. 7, 8).

Figure 16:
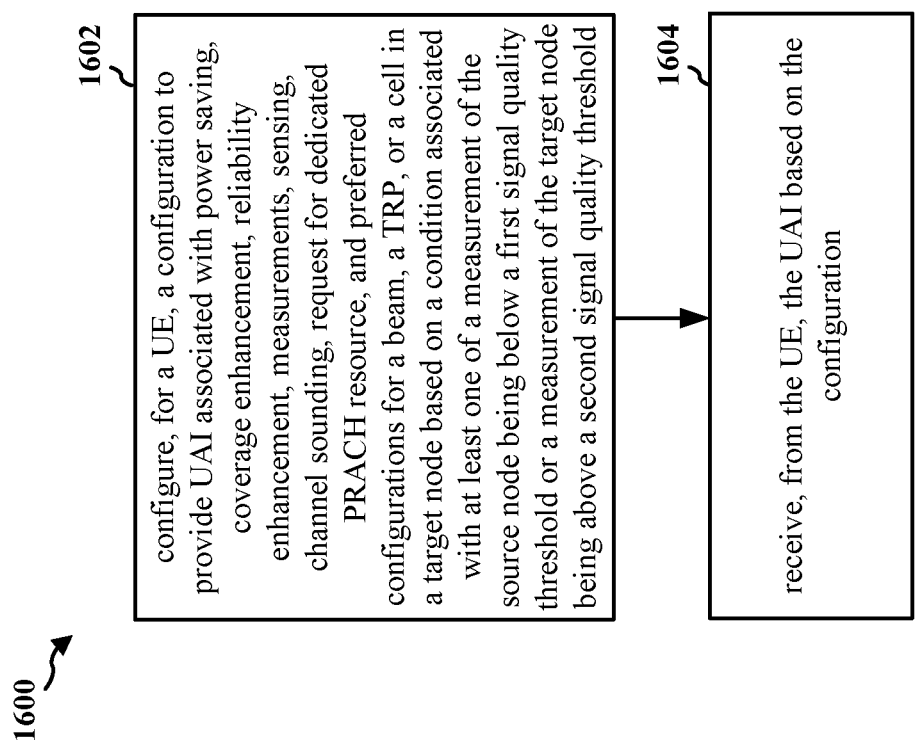
FIG. 16 is a flowchart of a method of wireless communication, in accordance with various aspects of the present disclosure.

FIG. 16 is a flowchart 1600 of a method of wireless communication. The method may be performed by a base station (e.g., the base station 102; the source node 604, 904; the network entity 1702, 1802, _1260. At 1602, the base station is configured to configure, for a UE, a configuration to provide UAI associated with power saving, coverage enhancement, reliability enhancement, measurements, sensing, channel sounding, request for dedicated PRACH resource, and preferred configurations for a beam, a TRP, or a cell in a target node based on a condition associated with at least one of a first measurement of the source node being below a first signal quality threshold or a second measurement of the target node being above a second signal quality threshold. In some aspects, 1602 may be performed by the component 199. For instance, with reference to FIG. 9, the source node 904 may be configured to configure (and provide) one or more configurations 906 to the UE 902. In aspects, the configurations 906 may be received by the UE 902, as transmitted by the source node 904, via DCI, RRC signaling, and/or the like. The configuration(s) 906 may include, without limitation, one or more configurations for the UE 902 to provide the UAI 912 associated with power saving, coverage enhancement, reliability enhancement, measurements, sensing, channel sounding, request for dedicated PRACH resource, and preferred configurations for a beam, a TRP, or a cell in the target node 905 based on a condition associated with at least one of a measurement of the source node 904 being below a first signal quality threshold or a measurement of the target node 905 being above a second signal quality threshold. The UE 902 may be configured to receive, from the source node 904 and/or the target node 905, signaling 908. The UE 902 may be configured to make a measurement(s) 910 that correspond the source node 904 and/or the target node 905 based on the signaling 908, where the measurement(s) 910 may be associated with UE mobility operations. The UE 902 may be configured to transmit to the source node 904 the measurement(s) 910, which may include more than one measurement, in aspects. For example, the UE 902 may transmit or report a measurement of at least one of the source node 904 or the target node 905 to the source node 904.

At 1604, the base station is configured to receive, from the UE, the UAI based on the configuration. In some aspects, 1604 may be performed by the component 199. For instance, with reference to FIG. 9, the source node 904 may be configured to receive the UAI 912 as transmitted by the UE 902. In aspects, the UAI 912 may be transmitted to and received by the source node 904 via a valid UL resource at the UE or via multiplexing with at least one of the measurement of the source node or the measurement of the target node (e.g., the measurement(s) 910). The UAI 912 may include a status for timer information, in aspects, such as, but not limited to, an earliest expiration of at least one of the BWP inactivity timer or the mobility reception timer, an indication of a stop, a pause, or a start/re-start of at least one of the BWP inactivity timer or the mobility reception timer, etc. The UAI may include a request(s), in aspects, such as but not limited to, a request for mobility enhancement at the UE 902. e.g., (1) a coverage or reliability enhancement of mobility-related DCI or RRC signaling, (2) a measurement enhancement associated with additional measurement opportunities or increased accuracy, (3) one or more of a channel sounding enhancement or a RACH enhancement for at least one of a link recovery, a beam failure recovery, or an RRC re-establishment, (4) a dedicated PRACH resource, and/or the like.

In aspects, the coverage or reliability enhancement may be associated with at least one of an aggregation level, repetitions of a CORESET, a slot aggregation, TB repetitions, a scaling factor for the DCI or TBs, a DMRS bundling scheme, an additional DMRS configuration, frequency hopping, PRB interleaving, a MCS adaptation, a waveform adaptation, or a power adaptation. In aspects, the measurement enhancement may be associated with at least one of requests for aperiodic and on-demand transmission of a beam-formed DL RS, where the beam-formed DL RS is at least one of a NCD-SSB, a CSI-RS, a TRS, or another DL RS in the source node or the target node. In aspects, the channel sounding enhancement or the RACH enhancement may be associated with an on-demand allocation of channel sounding RS or PRACH resources for a prioritized random access procedure, and the PRACH may be configured in an UL BWP associated with the default DL BWP or the active DL BWP for the UE 902.

In some aspects, there may be conditions present by which the UE 902 is triggered to transmit the UAI 912 to the source node 904 for mobility enhancement. For example, and without limitation, the UE 902 may have obtained its measurements (e.g., RRM) of source node (e.g., cell, TRP, etc.), or target node(s), the measurements of the source node may be below a set of pre-configured UAI signal quality thresholds (Q's), and/or the measurements of at least one target node may be above a set of pre-configured UAI signal quality thresholds (Q'n), and the UE 902 is configured with a valid UL resource or to multiplex the UAI 912 and the measurement(s) 910 before an earliest expiration of at least one of the BWP inactivity timer or the mobility reception timer.

Figure 17:
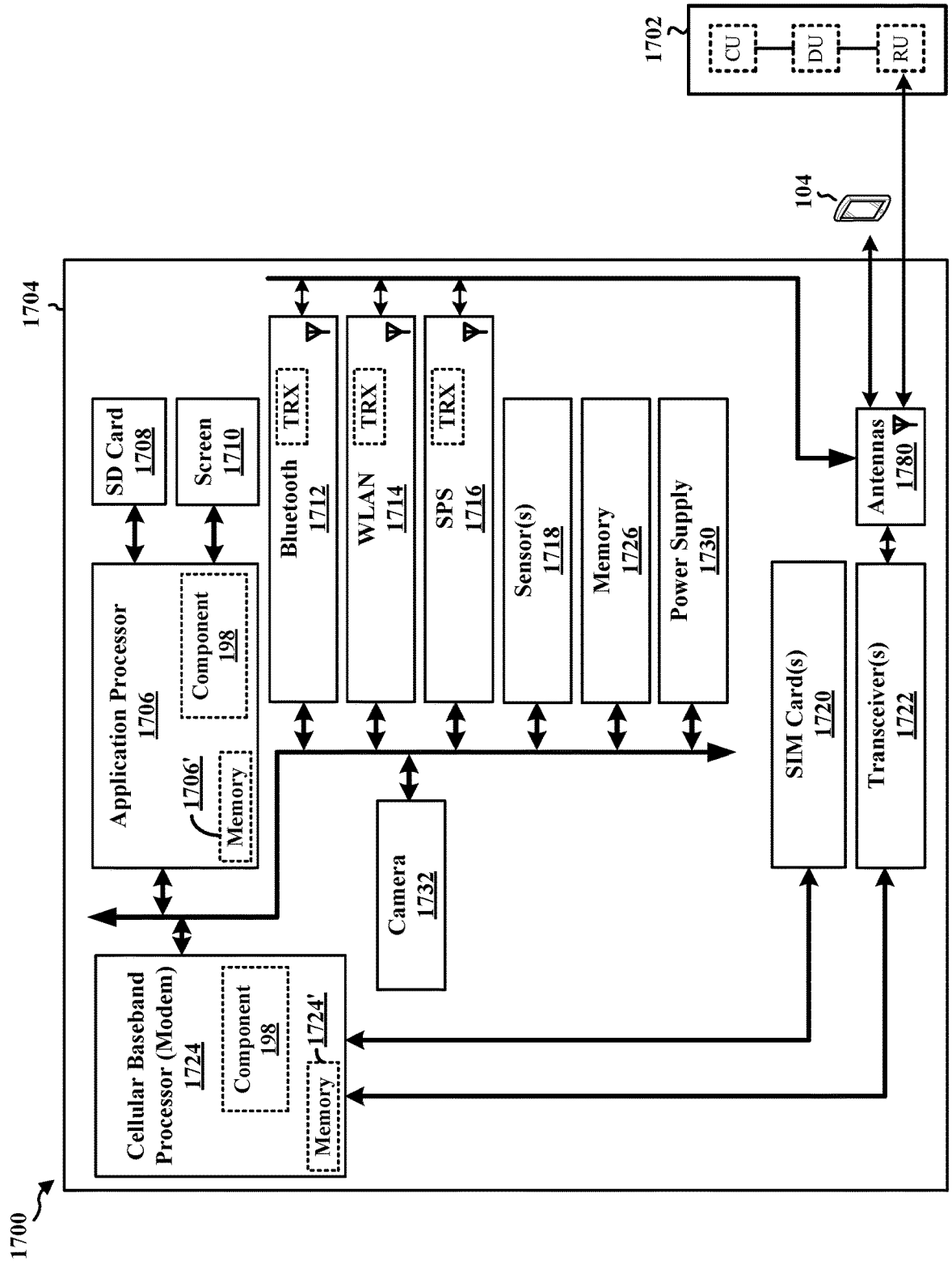
FIG. 17 is a diagram illustrating an example of a hardware implementation for an example apparatus and/or network entity.

FIG. 17 is a diagram 1700 illustrating an example of a hardware implementation for an apparatus 1704. The apparatus 1704 may be a UE, a component of a UE, or may implement UE functionality. In some aspects, the apparatus 1704 may include a cellular baseband processor 1724 (also referred to as a modem) coupled to one or more transceivers 1722 (e.g., cellular RF transceiver). The cellular baseband processor 1724 may include on-chip memory 1724'. In some aspects, the apparatus 1704 may further include one or more subscriber identity modules (SIM) cards 1720 and an application processor 1706 coupled to a secure digital (SD) card 1708 and a screen 1710. The application processor 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor 1724 communicates through the transceiver(s) 1722 via one or more antennas 1780 with the UE 104 and/or with an RU associated with a network entity 1702. The cellular baseband processor 1724 and the application processor 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor 1724 and the application processor 1706 are each responsible for general processing, including the execution of software stored on the computer-readable medium/memory. The software, when executed by the cellular baseband processor 1724/application processor 1706, causes the cellular baseband processor 1724/application processor 1706 to perform the various functions described supra. The computer-readable medium/memory may also be used for storing data that is manipulated by the cellular baseband processor 1724/application processor 1706 when executing software. The cellular baseband processor 1724/application processor 1706 may be a component of the UE 350 and may include the memory 360 and/or at least one of the TX processor 368, the RX processor 356, and the controller/processor 359. In one configuration, the apparatus 1704 may be a processor chip (modem and/or application) and include just the cellular baseband processor 1724 and/or the application processor 1706, and in another configuration, the apparatus 1704 may be the entire UE (e.g., sec UE 350 of FIG. 3) and include the additional modules of the apparatus 1704.

As discussed supra, the component 198 is configured to operate on an active downlink (DL) bandwidth part (BWP) in a source node, where the active DL BWP is not a default DL BWP associated with the UE. The component 198 is also configured to start a BWP inactivity timer at the UE that triggers a BWP switch from an active DL BWP to the default DL BWP after the BWP inactivity timer expires at a first expiration time. The component 198 is also configured to report a measurement of at least one of the source node or a target node. The component 198 is also configured to start a mobility reception timer based on a condition associated with at least one of the first measurement of the source node being below a first signal quality threshold or the second measurement of the target node being above a second signal quality threshold. In one configuration, the component 198 may be configured to stop or pause the BWP inactivity timer in response to starting the mobility reception timer. In the configuration, the component 198 may be configured to switch, from a first beam, a first transmission reception point (TRP), or first a cell in the source node, to a second beam, a second TRP, or a second cell in the target node of the UE based on receiving mobility information from the source node prior to reaching a second expiration time associated with the mobility reception timer, or may be configured to switch from the active DL BWP in the source node to the default DL BWP in the source node that is associated with the UE based on reaching the second expiration time of the mobility reception timer and without receiving the mobility information from the source node. In one configuration, the component 198 may be configured to monitor at least one search space set in the active DL BWP of the UE for DL control signaling associated with the mobility information received from the source node, while the mobility reception timer is active. In one configuration, the component 198 may be configured to receive, from the source node, a configuration for at least one of the active DL BWP, the default DL BWP, the BWP inactivity timer, the first expiration time of the BWP inactivity timer, the mobility reception timer, the second expiration time of the mobility reception timer, one or more measurement objects, a transmission and resource allocation scheme for the measurement reporting, a first number of monitoring occasions for a search space set and a DL control signaling format before the mobility reception timer starts, a second number of monitoring occasions for the search space set and the DL control signaling format after the mobility reception timer starts, a scrambling sequence for the DL control signaling or mobility information, an identifier for the UE or a UE group including the UE, a transmission and resource allocation scheme for UE assistance information, the first signal quality threshold of the source node, or the second signal quality threshold of the target node. In one configuration, where to start the mobility reception timer, the component 198 may be configured to start the mobility reception timer before the BWP inactivity timer expires at the first expiration time based at least on determining a time duration between a time of reporting the measurement and the first expiration time of the BWP inactivity timer is lower than a pre-configured threshold for the mobility reception timer, where the BWP inactivity timer is associated with a first time window configuration for the UE to receive control and data information that is unicast or multicast to the UE, and the mobility reception timer is associated with a second time window configuration for the UE to receive mobility information associated with the UE or a UE group, and the component 198 may be configured to restart the BWP inactivity timer after starting the mobility reception timer, where the restarted BWP inactivity timer is associated with an adjusted first expiration time, and switch, from a first beam, a first reception point (TRP, or a first cell in the source node, to a second beam, a second TRP, or a second cell in the target node associated with the UE, based on receiving mobility information from the source node and prior to reaching a greater or a lesser of the adjusted first expiration time of the BWP inactivity timer and the second expiration time of the mobility reception timer, or switch from the active DL BWP of the source node to the default DL BWP of the source node that is associated with the UE based on reaching the second expiration time associated with a greater or a lesser of the adjusted first expiration time of the BWP inactivity timer and the second expiration time of the mobility reception timer, and without the mobility information from the source node. In one configuration, the component 198 may be configured to monitor at least one search space set in the active DL BWP of the UE for DL control signaling associated with the mobility information received from the source node while at least one of the BWP inactivity timer or the mobility reception timer is active. In one configuration, the component 198 may be configured to receive, from the source node, a configuration for at least one of the active DL BWP, the default DL BWP, the BWP inactivity timer, the first expiration time, the mobility reception timer, the second expiration time, one or more measurement objects, a reporting resource, the first signal quality threshold, the second signal quality threshold, or the adjusted first expiration time. In one configuration, the component 198 is configured to perform a measurement of at least one of a source node or a target node. In the configuration, the component 198 is configured to transmit UAI associated with power saving, coverage enhancement, reliability enhancement, measurements, sensing, channel sounding, a dedicated PRACH resource, and preferred configurations for a beam, a TRP, or a cell in the target node based on a condition associated with at least one of the first measurement of the source node being below a first signal quality threshold or the second measurement of the target node being above a second signal quality threshold. The component 198 may be configured to perform any of the aspects described in connection with FIGS. 10, 11, 12, 13, 14, 15, 16 and/or performed by the UE in FIGS. 6, 9. The component 198 may be within the cellular baseband processor 1724, the application processor 1706, or both the cellular baseband processor 1724 and the application processor 1706. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1704 may include a variety of components configured for various functions. In one configuration, the apparatus 1704, and in particular the cellular baseband processor 1724 and/or the application processor 1706, may include means for operating on an active DL BWP in a source node, where the active DL BWP is not a default DL BWP associated with the UE. In one configuration, the apparatus 1704, and in particular the cellular baseband processor 1724 and/or the application processor 1706, may include means for starting a BWP inactivity timer at the UE that triggers a BWP switch from an active DL BWP to the default DL BWP after the BWP inactivity timer expires at a first expiration time. In one configuration, the apparatus 1704, and in particular the cellular baseband processor 1724 and/or the application processor 1706, may include means for reporting a measurement of at least one of the source node or a target node. In one configuration, the apparatus 1704, and in particular the cellular baseband processor 1724 and/or the application processor 1706, may include means for starting a mobility reception timer based on a condition associated with at least one of the first measurement of the source node being below a first signal quality threshold or the second measurement of the target node being above a second signal quality threshold. In one configuration, the apparatus 1704, and in particular the cellular baseband processor 1724 and/or the application processor 1706, may include means for stopping or pausing the BWP inactivity timer in response to starting the mobility reception timer. In one configuration, the apparatus 1704, and in particular the cellular baseband processor 1724 and/or the application processor 1706, may include means for switching, from a first beam, a first transmission reception point (TRP), or first a cell in the source node, to a second beam, a second TRP, or a second cell in the target node of the UE based on receiving mobility information from the source node prior to reaching a second expiration time associated with the mobility reception timer. In one configuration, the apparatus 1704, and in particular the cellular baseband processor 1724 and/or the application processor 1706, may include means for switching from the active DL BWP in the source node to the default DL BWP in the source node that is associated with the UE based on reaching the second expiration time of the mobility reception timer and without receiving the mobility information from the source node. In one configuration, the apparatus 1704, and in particular the cellular baseband processor 1724 and/or the application processor 1706, may include means for monitoring at least one search space set in the active DL BWP of the UE for DL control signaling associated with the mobility information received from the source node, while the mobility reception timer is active. In one configuration, the apparatus 1704, and in particular the cellular baseband processor 1724 and/or the application processor 1706, may include means for receiving, from the source node, a configuration for at least one of the active DL BWP, the default DL BWP, the BWP inactivity timer, the first expiration time of the BWP inactivity timer, the mobility reception timer, the second expiration time of the mobility reception timer, one or more measurement objects, a transmission and resource allocation scheme for the measurement reporting, a first number of monitoring occasions for a search space set and a DL control signaling format before the mobility reception timer starts, a second number of monitoring occasions for the search space set and the DL control signaling format after the mobility reception timer starts, a scrambling sequence for the DL control signaling or mobility information, an identifier for the UE or a UE group including the UE, a transmission and resource allocation scheme for UE assistance information, the first signal quality threshold of the source node, or the second signal quality threshold of the target node. In one configuration, the apparatus 1704, and in particular the cellular baseband processor 1724 and/or the application processor 1706, may include means for starting the mobility reception timer before the BWP inactivity timer expires at the first expiration time based at least on determining a time duration between a time of reporting the measurement and the first expiration time of the BWP inactivity timer is lower than a pre-configured threshold for the mobility reception timer, where the BWP inactivity timer is associated with a first time window configuration for the UE to receive control and data information that is unicast or multicast to the UE, and the mobility reception timer is associated with a second time window configuration for the UE to receive mobility information associated with the UE or a UE group. In one configuration, the apparatus 1704, and in particular the cellular baseband processor 1724 and/or the application processor 1706, may include means for restarting the BWP inactivity timer after starting the mobility reception timer, where the restarted BWP inactivity timer is associated with an adjusted first expiration time. In one configuration, the apparatus 1704, and in particular the cellular baseband processor 1724 and/or the application processor 1706, may include means for switching, from a first beam, a first transmission reception point (TRP), or a first cell in the source node, to a second beam, a second TRP, or a second cell in the target node associated with the UE, based on receiving mobility information from the source node and prior to reaching a greater or a lesser of the adjusted first expiration time of the BWP inactivity timer and the second expiration time of the mobility reception timer. In one configuration, the apparatus 1704, and in particular the cellular baseband processor 1724 and/or the application processor 1706, may include means for switching from the active DL BWP of the source node to the default DL BWP of the source node that is associated with the UE based on reaching the second expiration time associated with a greater or a lesser of the adjusted first expiration time of the BWP inactivity timer and the second expiration time of the mobility reception timer, and without receiving the mobility information from the source node. In one configuration, the apparatus 1704, and in particular the cellular baseband processor 1724 and/or the application processor 1706, may include means for monitoring at least one search space set in the active DL BWP of the UE for DL control signaling associated with the mobility information received from the source node while at least one of the BWP inactivity timer or the mobility reception timer is active, receiving, from the source node, a configuration for at least one of the active DL BWP, the default DL BWP, the BWP inactivity timer, the first expiration time, the mobility reception timer, the second expiration time, one or more measurement objects, a reporting resource, the first signal quality threshold, the second signal quality threshold, or the adjusted first expiration time. In one configuration, the apparatus 1704, and in particular the cellular baseband processor 1724 and/or the application processor 1706, may include means for performing a measurement of at least one of a source node or a target node. In one configuration, the apparatus 1704, and in particular the cellular baseband processor 1724 and/or the application processor 1706, may include means for transmitting UAI associated with power saving, coverage enhancement, reliability enhancement, measurements, sensing, channel sounding, a dedicated PRACH resource, and preferred configurations for a beam, a TRP, or a cell in the target node based on a condition associated with at least one of the first measurement of the source node being below a first signal quality threshold or the second measurement of the target node being above a second signal quality threshold. In one configuration, the apparatus 1704, and in particular the cellular baseband processor 1724 and/or the application processor 1706, may include means for performing any of the aspects described in connection with FIGS. 10, 11, 12, 13, 14, 15, 16 and/or performed by the UE in FIGS. 6, 9. The means may be the component 198 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

Figure 18:
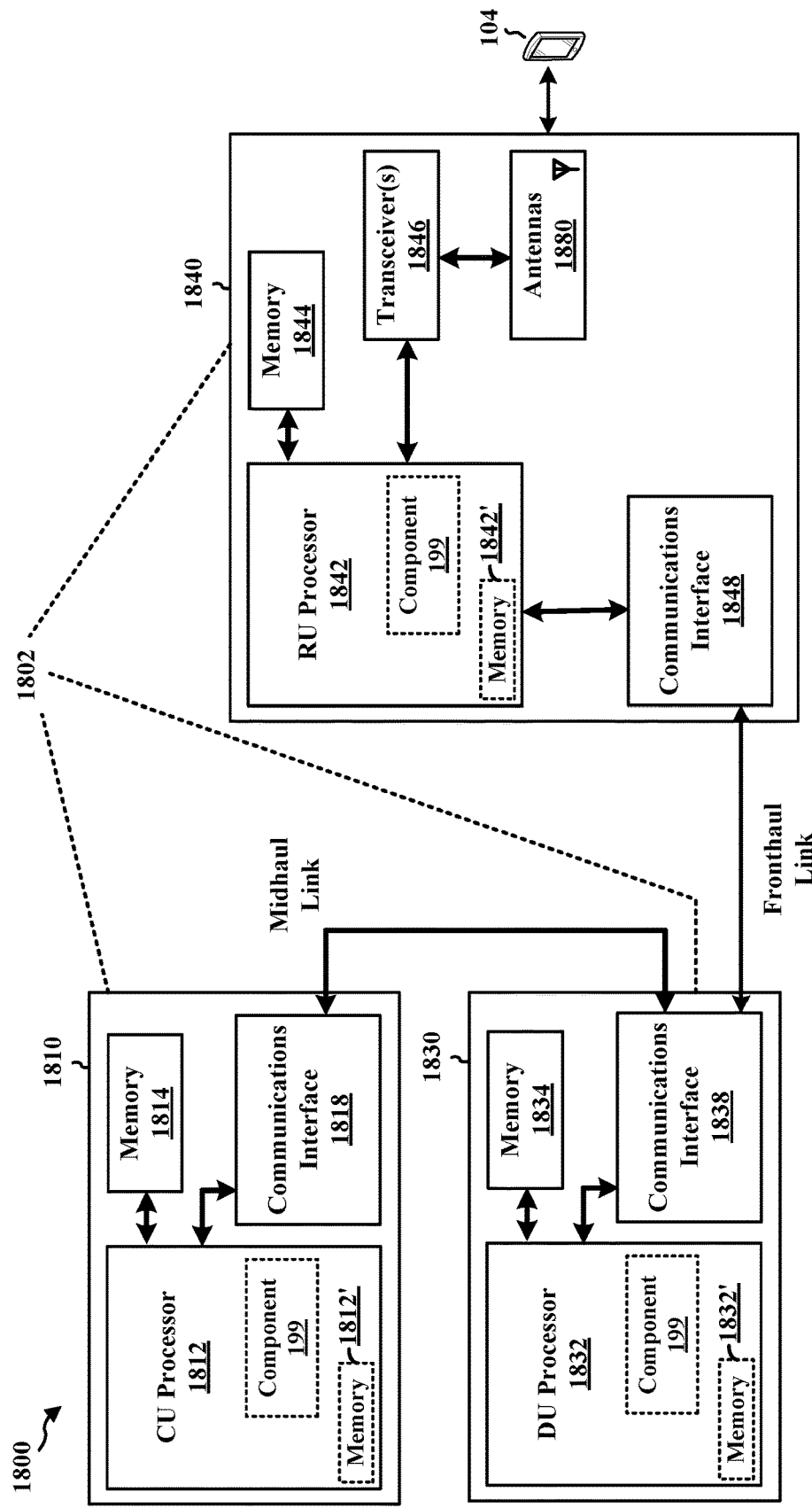
FIG. 18 is a diagram illustrating an example of a hardware implementation for an example network entity.

FIG. 18 is a diagram 1800 illustrating an example of a hardware implementation for a network entity 1802. The network entity 1802 may be a BS, a component of a BS, or may implement BS functionality. The network entity 1802 may include at least one of a CU 1810, a DU 1830, or an RU 1840. For example, depending on the layer functionality handled by the component 199, the network entity 1802 may include the CU 1810; both the CU 1810 and the DU 1830; each of the CU 1810, the DU 1830, and the RU 1840; the DU 1830; both the DU 1830 and the RU 1840; or the RU 1840. The CU 1810 may include a CU processor 1812. The CU processor 1812 may include on-chip memory 1812'. In some aspects, the CU 1810 may further include additional memory modules 1814 and a communications interface 1818. The CU 1810 communicates with the DU 1830 through a midhaul link, such as an F1 interface. The DU 1830 may include a DU processor 1832. The DU processor 1832 may include on-chip memory 1832'. In some aspects, the DU 1830 may further include additional memory modules 1834 and a communications interface 1838. The DU 1830 communicates with the RU 1840 through a fronthaul link. The RU 1840 may include an RU processor 1842. The RU processor 1842 may include on-chip memory 1842'. In some aspects, the RU 1840 may further include additional memory modules 1844, one or more transceivers 1846, antennas 1880, and a communications interface 1848. The RU 1840 communicates with the UE 104. The on-chip memory 1812', 1832', 1842' and the additional memory modules 1814, 1834, 1844 may each be considered a computer-readable medium/memory. Each computer-readable medium/memory may be non-transitory. Each of the processors 1812, 1832, 1842 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, in one configuration the component 199 is configured to configure, for a UE, a first configuration for an active DL BWP at the UE, a second configuration for a default DL BWP at the UE, a BWP inactivity timer, and a mobility reception timer. The component 199 is also configured to receive, from the UE, a measurement of at least one of the source node or a target node, where the measurement corresponds to the UE operating on the active DL BWP in the source node, where the BWP inactivity timer and the mobility reception timer are configured with a triggering condition associated with the measurement. In the configuration, the component 199 may be configured to provide, for the UE via DL signaling and based on the measurement of at least one of the source node or the target node, mobility information that includes a handoff command associated with the target node, where the DL signaling corresponds to a slot during at least one of the BWP inactivity timer or the mobility reception timer. In another configuration the component 199 is configured to configure, for a UE, a configuration to provide UAI associated with power saving, coverage enhancement, reliability enhancement, measurements, sensing, channel sounding, request for dedicated PRACH resource, and preferred configurations for a beam, a TRP, or a cell in a target node based on a condition associated with at least one of a first measurement of the source node being below a first signal quality threshold or a second measurement of the target node being above a second signal quality threshold. The component 199 is also configured to receive, from the UE, the UAI based on the configuration. The component 199 may also be configured to configure the PRACH in an UL BWP associated with a default DL BWP or the active DL BWP. The component 199 may be further configured to perform any of the aspects described in connection with FIGS. 10, 11, 12, 13, 14, 15, 16 and/or performed by the source node (e.g., a network entity/node; a gNB; a base station) in FIG. 6. The component 199 may be within one or more processors of one or more of the CU 1810, DU 1830, and the RU 1840. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1802 may include a variety of components configured for various functions. In one configuration, the network entity 1802 may include means for configuring, for a UE, a first configuration for an active DL BWP at the UE, a second configuration for a default DL BWP at the UE, a BWP inactivity timer, and a mobility reception timer. In one configuration, the network entity 1802 may include means for receiving, from the UE, a measurement of at least one of the source node or a target node, where the measurement corresponds to the UE operating on the active DL BWP in the source node, and where the BWP inactivity timer and the mobility reception timer are configured with a triggering condition associated with the measurement. In one configuration, the network entity 1802 may include means for providing, for the UE via DL signaling and based on the measurement of at least one of the source node or the target node, mobility information that includes a handoff command associated with the target node, where the DL signaling corresponds to a slot during at least one of the BWP inactivity timer or the mobility reception timer. In one configuration, the network entity 1802 may include means for configuring, for a UE, a configuration to provide UAI associated with power saving, coverage enhancement, reliability enhancement, measurements, sensing, channel sounding, request for dedicated PRACH resource, and preferred configurations for a beam, a TRP, or a cell in a target node based on a condition associated with at least one of a first measurement of the source node being below a first signal quality threshold or a second measurement of the target node being above a second signal quality threshold. In one configuration, the network entity 1802 may include means for receiving, from the UE, the UAI based on the configuration. In one configuration, the network entity 1802 may include means for configuring the PRACH in an UL BWP associated with a default DL BWP or the active DL BWP. In one configuration, the network entity 1802 may include means for performing any of the aspects described in connection with FIGS. 10, 11, 12, 13, 14, 15, 16 and/or performed by the network entity (e.g., source node, network node, base station, a component of a base station) in FIGS. 6, 9. The means may be the component 199 of the network entity 1802 configured to perform the functions recited by the means. As described supra, the network entity 1802 may include the TX processor 316, the RX processor 370, and the controller/processor 375. As such, in one configuration, the means may be the TX processor 316, the RX processor 370, and/or the controller/processor 375 configured to perform the functions recited by the means.

Wireless communication networks, such as a 5G NR network, may be designed to include UE mobility. A UE may receive a command(s) from a network for mobility operations. For example, a UE may make measurements related to a source node and a target node(s) and provide such measurements in a report to the source node which may in turn initiate cell- or beam-level mobility with the target node away from the source node, such as a handover (HO) operation by way of example. HO failure may occur in some cases when communications between the UE and the source node do not complete. Compounding this issue, the UE may be configured switch from operating in an active DL BWP on the source node to a default DL BWP based on timer for inactivity in order to save power. In such configurations, the HO command from the source node may arrive in the active DL BWP, while the UE has switched to the default DL BWP; the network side operations for a HO may include multiple processing steps and may require some time to complete. In such cases, the UE may miss the HO command entirely as well as the opportunity for a network initiated HO. Latency in the network-side response for mobility operations may be problematic with respect mobility and power saving, and with network-side densification and new spectrum opened for 5GA/6G, as well as expanded support for new devices with higher speeds, more frequent cell-/beam-level mobility may be expected for the UE and/or the network. Aspects herein enable a UE to be configured to advantageously manipulate BWP inactivity timers (e.g., stop, pause, continue, restart, etc.) and utilize mobility reception timers to allow the UE to remain in an active DL BWP in a source node for additional time to monitor DL search space sets for mobility information from the source node, and enable flexibility in providing UE assistance information (UAI) to a source node for mobility operations.

Various aspects relate generally to mobility enhancements and power saving considerations for user equipment. Some aspects more specifically relate to utilizing a mobility reception timer and/or an adjusted BWP inactivity, while further aspects more specifically relate to providing UAI to a source node. In some examples, a BWP inactivity timer may be paused or stopped when the mobility reception timer is started, while some examples continue running the BWP inactivity timer, and adjusting its expiration, when starting the mobility reception timer. In other examples, UAI may be provided via valid uplink resources or via multiplexing with source/target node measurements. Utilizing a mobility reception timer and/or an adjusted BWP inactivity timer provide a UE with additional time to monitor for mobility information after a BWP inactivity timer expires, and the UAI provides for additional mobility enhancements. With the additional monitoring time, the UE may be enabled to switch, from a first beam, a first TRP, or a first cell in the source node, to a second beam, a second TRP, or a second cell in the target node, while the UE still remains enabled to switch from the active DL BWP to the default DL BWP after enough time passes. Additionally, the UE may provide UAI, for mobility enhancements, via a valid UL resource or via multiplexing with the measurement report. Thus, aspects provide for mobility enhancements, such as in connected modes, which may be applied in legacy implementations, as well as 5G, 5GA, and 6G, or be combined with solutions proposed for 5G to improve power saving, latency, and robustness of mobility at cell- and/or beam-levels.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, comprising: operating on an active downlink (DL) bandwidth part (BWP) in a source node, where the active DL BWP is not a default DL BWP associated with the UE; starting a BWP inactivity timer at the UE that triggers a BWP switch from an active DL BWP to the default DL BWP after the BWP inactivity timer expires at a first expiration time; reporting a measurement of at least one of the source node or a target node; and starting a mobility reception timer based on a condition associated with at least one of the first measurement of the source node being below a first signal quality threshold or the second measurement of the target node being above a second signal quality threshold.

Aspect 2 is the method of aspect 1, further comprising: stopping or pausing the BWP inactivity timer in response to starting the mobility reception timer; and switching, from a first beam, a first transmission reception point (TRP), or first a cell in the source node, to a second beam, a second TRP, or a second cell in the target node of the UE based on receiving mobility information from the source node prior to reaching a second expiration time associated with the mobility reception timer, or switching from the active DL BWP in the source node to the default DL BWP in the source node that is associated with the UE based on reaching the second expiration time of the mobility reception timer and without receiving the mobility information from the source node.

Aspect 3 is the method of aspect 2, further comprising: monitoring at least one search space set in the active DL BWP of the UE for DL control signaling associated with the mobility information received from the source node, while the mobility reception timer is active.

Aspect 4 is the method of aspect 3, where monitoring at least one search space set of DL control signaling received from the source node for the mobility information includes reducing a number of monitoring occasions for the DL control signaling subsequent to starting the mobility reception timer, based at least on a pre-configured rule, a reduction configuration from the source node, UE assistance information for power saving, or a hybrid thereof.

Aspect 5 is the method of aspect 3, where the at least one search space set associated with mobility information reception includes one or more of a common search space (CSS) set or a UE-specific search space (USS) set configuration, an identifier for the UE or a UE group including the UE, a DL control signaling format configured for PDCCH ordered timing advance or mobility procedure, or a combination thereof.

Aspect 6 is the method of any of aspects 1 and 2, further comprising: receiving, from the source node via at least one transceiver of the UE, a configuration for at least one of the active DL BWP, the default DL BWP, the BWP inactivity timer, the first expiration time of the BWP inactivity timer, the mobility reception timer, the second expiration time of the mobility reception timer, one or more measurement objects, a transmission and resource allocation scheme for the measurement reporting, a first number of monitoring occasions for a search space set and a DL control signaling format before the mobility reception timer starts, a second number of monitoring occasions for the search space set and the DL control signaling format after the mobility reception timer starts, a scrambling sequence for the DL control signaling or mobility information, an identifier for the UE or a UE group including the UE, a transmission and resource allocation scheme for UE assistance information, the first signal quality threshold of the source node, or the second signal quality threshold of the target node.

Aspect 7 is the method of aspect 1, where starting the mobility reception timer includes starting the mobility reception timer before the BWP inactivity timer expires at the first expiration time based at least on determining a time duration between a time of reporting the measurement and the first expiration time of the BWP inactivity timer is lower than a pre-configured threshold for the mobility reception timer, where the BWP inactivity timer is associated with a first time window configuration for the UE to receive control and data information that is unicast or multicast to the UE, and the mobility reception timer is associated with a second time window configuration for the UE to receive mobility information associated with the UE or a UE group; where the method further comprises: restarting the BWP inactivity timer after starting the mobility reception timer, where the restarted BWP inactivity timer is associated with an adjusted first expiration time; and switching, from a first beam, a first transmission reception point (TRP), or a first cell in the source node, to a second beam, a second TRP, or a second cell in the target node associated with the UE, based on receiving mobility information from the source node and prior to reaching a greater or a lesser of the adjusted first expiration time of the BWP inactivity timer and the second expiration time of the mobility reception timer, or switching from the active DL BWP of the source node to the default DL BWP of the source node that is associated with the UE based on reaching the second expiration time associated with a greater or a lesser of the adjusted first expiration time of the BWP inactivity timer and the second expiration time of the mobility reception timer, and without receiving the mobility information from the source node.

Aspect 8 is the method of aspect 7, further comprising: monitoring at least one search space set in the active DL BWP of the UE for DL control signaling associated with the mobility information received from the source node while at least one of the BWP inactivity timer or the mobility reception timer is active.

Aspect 9 is the method of aspect 8, where monitoring the at least one search space set of DL control signaling received from the source node for the mobility information includes reducing a number of monitoring occasions for the DL control signaling subsequent to starting the mobility reception timer, based at least on a pre-configured rule, a reduction configuration from the source node, UE assistance information for power saving, or a hybrid thereof.

Aspect 10 is the method of any of aspects 7 to 9, where the adjusted first expiration time is an integer multiple, or a portion of the first expiration time.

Aspect 11 is the method of any of aspects 7 to 10, further comprising: receiving, from the source node via at least one transceiver of the UE, a configuration for at least one of the active DL BWP, the default DL BWP, the BWP inactivity timer, the first expiration time, the mobility reception timer, the second expiration time, one or more measurement objects, a reporting resource, the first signal quality threshold, the second signal quality threshold, or the adjusted first expiration time.

Aspect 12 is a method of wireless communication at a user equipment (UE), comprising: performing a measurement of at least one of a source node or a target node; and transmitting UE assistance information (UAI) associated with power saving, coverage enhancement, reliability enhancement, measurements, sensing, channel sounding, a dedicated physical random access channel (PRACH) resource, and preferred configurations for a beam, a transmission reception point (TRP), or a cell in the target node based on a condition associated with at least one of the first measurement of the source node being below a first signal quality threshold or the second measurement of the target node being above a second signal quality threshold.

Aspect 13 is the method of aspect 12, where the UAI includes a status of at least one of a bandwidth part (BWP) inactivity timer at the UE or a mobility reception timer at the UE.

Aspect 14 is the method of aspect 13, where transmitting the UAI includes: transmitting the UAI via at least one transceiver of the UE and via a valid uplink resource at the UE; or transmitting the UAI via at least one transceiver of the UE and via multiplexing with at least one of the measurement of the source node or the measurement of the target node prior to an earliest expiration associated with at least one of the BWP inactivity timer or the mobility reception timer.

Aspect 15 is the method of any of aspects 13 and 14, where the status indicates at least one of: an earliest expiration of at least one of the BWP inactivity timer or the mobility reception timer, or an indication of a stop, a pause, or a start of at least one of the BWP inactivity timer or the mobility reception timer.

Aspect 16 is the method of any of aspects 12 to 15, where the UAI includes a request for mobility enhancement at the UE, where the request is for at least one of: a coverage or reliability enhancement of mobility-related downlink (DL) control information (DCI) or radio resource control (RRC) signaling, a measurement enhancement associated with additional measurement opportunities or increased accuracy, one or more of a channel sounding enhancement or a random access channel (RACH) enhancement for at least one of a link recovery, a beam failure recovery, or an RRC re-establishment, or the dedicated PRACH resource.

Aspect 17 is the method of aspect 16, where the coverage or reliability enhancement is associated with at least one of an aggregation level, repetitions of a control resource set (CORESET), a slot aggregation, transport block (TB) repetitions, a scaling factor for the DCI or TBs, a demodulation reference signal (DMRS) bundling scheme, an additional DMRS configuration, frequency hopping, physical resource block (PRB) interleaving, a modulation and coding scheme (MCS) adaptation, a waveform adaptation, or a power adaptation.

Aspect 18 is the method of any of aspects 16 and 17, where the measurement enhancement is associated with at least one of requests for aperiodic and on-demand transmission of a beam-formed DL reference signal (RS), where the beam-formed DL RS is at least one of a NCD-SSB, channel state information (CSI) reference signal (CSI-RS), a tracking RS (TRS), or another DL RS in the source node or the target node.

Aspect 19 is the method of any of aspects 16 to 18, where the channel sounding enhancement or the RACH enhancement is associated with an on-demand allocation of channel sounding reference signal (RS) or physical random access channel (PRACH) resources for a prioritized random access procedure.

Aspect 20 is the method of aspect 19, where the PRACH is configured in an uplink (UL) bandwidth part (BWP) associated with a default DL BWP or the active DL BWP.

Aspect 21 is a method of wireless communication at a source node, comprising: configuring, for a user equipment (UE), a first configuration for an active downlink (DL) bandwidth part (BWP) at the UE, a second configuration for a default DL BWP at the UE, a BWP inactivity timer, and a mobility reception timer; and receiving, from the UE, a measurement of at least one of the source node or a target node, where the measurement corresponds to the UE operating on the active DL BWP in the source node; where the BWP inactivity timer and the mobility reception timer are configured with a triggering condition associated with the measurement.

Aspect 22 is the method of aspect 21, further comprising configuring at least one of: a first expiration time of the BWP inactivity timer, an adjusted first expiration time of the BWP inactivity timer, a second expiration time of the mobility reception timer, one or more measurement objects, a reporting resource, a first signal quality threshold associated with the source node, or a second signal quality threshold associated with the target node.

Aspect 23 is the method of aspect 22, where the first signal quality threshold associated with the source node and the second signal quality threshold associated with the target node each correspond to the triggering condition.

Aspect 24 is the method of any of aspects 21 to 23, further comprising: providing, for the UE via DL signaling and via at least one transceiver of the source node and based on the measurement of at least one of the source node or the target node, mobility information that includes a handoff command associated with the target node, where the DL signaling corresponds to a slot during at least one of the BWP inactivity timer or the mobility reception timer.

Aspect 25 is a method of wireless communication at a source node, comprising: configuring, for a user equipment (UE), a configuration to provide UE assistance information (UAI) associated with power saving, coverage enhancement, reliability enhancement, measurements, sensing, channel sounding, request for dedicated physical random access channel (PRACH) resource, and preferred configurations for a beam, a transmission reception point (TRP), or a cell in a target node based on a condition associated with at least one of a first measurement of the source node being below a first signal quality threshold or a second measurement of the target node being above a second signal quality threshold; and receiving, from the UE, the UAI based on the configuration.

Aspect 26 is the method of aspect 25, where the UAI includes a status of at least one of a bandwidth part (BWP) inactivity timer at the UE or a mobility reception timer at the UE.

Aspect 27 is the method of aspect 26, where receiving the UAI includes: receiving the UAI from the UE via at least one transceiver of the source node and via a valid uplink resource; or receiving the UAI from the UE via at least one transceiver of the source node and via multiplexing with at least one of the measurement of the source node or the measurement of the target node prior to an earliest expiration associated with at least one of the BWP inactivity timer or the mobility reception timer.

Aspect 28 is the method of any of aspects 26 and 27, where the status indicates at least one of: an earliest expiration of at least one of the BWP inactivity timer or the mobility reception timer, or an indication of a stop, a pause, or a start of at least one of the BWP inactivity timer or the mobility reception timer.

Aspect 29 is the method of any of aspects 25 to 28, where the UAI includes a request for mobility enhancement at the UE, where the request includes at least one of: a coverage or reliability enhancement of mobility-related downlink (DL) control information (DCI) or radio resource control (RRC) signaling, a measurement enhancement associated with additional measurement opportunities or increased accuracy, or one or more of a channel sounding enhancement or a random access channel (RACH) enhancement for at least one of a link recovery, a beam failure recovery, or an RRC re-establishment.

Aspect 30 is the method of aspect 29, where: the coverage or reliability enhancement is associated with at least one of an aggregation level, repetitions of a control resource set (CORESET), a slot aggregation, transport block (TB) repetitions, a scaling factor for the DCI or TBs, a demodulation reference signal (DMRS) bundling scheme, an additional DMRS configuration, frequency hopping, physical resource block (PRB) interleaving, a modulation and coding scheme (MCS) adaptation, a waveform adaptation, or a power adaptation; the measurement enhancement is associated with at least one of requests for aperiodic and on-demand transmission of a beam-formed DL reference signal (RS), where the DL reference signal RS is at least one of a NCD-SSB, channel state information (CSI) reference signal (CSI-RS), a tracking RS (TRS), or another DL RS in the source node or the target node; or the channel sounding enhancement or the RACH enhancement is associated with an on-demand allocation of channel sounding RS or physical random access channel (PRACH) resources for a prioritized random access procedure, and the method further comprises: configuring the PRACH in an uplink (UL) bandwidth part (BWP) associated with a default DL BWP or the active DL BWP.

Aspect 31 is an apparatus for wireless communication at a UE. The apparatus includes a memory; and at least one processor coupled to the memory and, based at least in part on information stored in the memory, the at least one processor is configured to implement any of aspects 1 to 20.

Aspect 32 is the apparatus of aspect 31, further including at least one of a transceiver or an antenna coupled to the at least one processor.

Aspect 33 is an apparatus for wireless communication including means for implementing any of aspects 1 to 20.

Aspect 34 is a computer-readable medium (e.g., a non-transitory computer-readable medium) storing computer executable code, the code when executed by at least one processor causes the at least one processor to implement any of aspects 1 to 20.

Aspect 35 is an apparatus for wireless communication at a network node. The apparatus includes a memory; and at least one processor coupled to the memory and, based at least in part on information stored in the memory, the at least one processor is configured to implement any of aspects 21 to 30.

Aspect 36 is the apparatus of aspect 35, further including at least one of a transceiver or an antenna coupled to the at least one processor.

Aspect 37 is an apparatus for wireless communication including means for implementing any of aspects 21 to 30.

Aspect 38 is a computer-readable medium (e.g., a non-transitory computer-readable medium) storing computer executable code, the code when executed by at least one processor causes the at least one processor to implement any of aspects 21 to 30.

What is claimed is:
1. An apparatus for wireless communications at a user equipment (UE), comprising:
a memory; and
at least one processor coupled to the memory and, based at least in part on information stored in the memory, the at least one processor is configured to:
operate on an active downlink (DL) bandwidth part (BWP) in a source node, wherein the active DL BWP is not a default DL BWP associated with the UE;

start a BWP inactivity timer at the UE that triggers a BWP switch from an active DL BWP to the default DL BWP after the BWP inactivity timer expires at a first expiration time;

report a measurement of at least one of the source node or a target node;

start a mobility reception timer based on a condition associated with at least one of a first measurement of the source node being below a first signal quality threshold or a second measurement of the target node being above a second signal quality threshold, wherein the mobility reception timer is associated with a time window to receive mobility information for the UE on the active DL BWP; and stop, pause, or restart the BWP inactivity timer in response to the start of the mobility reception timer.

2. The apparatus of claim 1, wherein stopping, pausing, or restarting the BWP inactivity timer in response to the start of the mobility reception timer comprising stopping or pausing the BWP inactivity timer, wherein the at least one processor is further configured to:

stop or pause the BWP inactivity timer in response to the start of the mobility reception timer; and switch, from a first beam, a first transmission reception point (TRP), or first a cell in the source node, to a second beam, a second TRP, or a second cell in the target node of the UE based on receiving mobility information from the source node prior to reaching a second expiration time associated with the mobility reception timer, or switch from the active DL BWP in the source node to the default DL BWP in the source node that is associated with the UE based on reaching the second expiration time of the mobility reception timer and without receiving the mobility information from the source node.

3. The apparatus of claim 2, wherein the at least one processor is further configured to:

monitor at least one search space set in the active DL BWP of the UE for DL control signaling associated with the mobility information received from the source node, while the mobility reception timer is active.

4. The apparatus of claim 3, wherein to monitor at least one search space set of DL control signaling received from the source node for the mobility information, the at least one processor is configured to reduce a number of monitoring occasions for the DL control signaling subsequent to starting the mobility reception timer, based at least on a pre-configured rule, a reduction configuration from the source node, UE assistance information for power saving, or a hybrid thereof.

5. The apparatus of claim 3, wherein the at least one search space set associated with mobility information reception includes one or more of a common search space (CSS) set or a UE-specific search space (USS) set configuration, an identifier for the UE or a UE group including the UE, a DL control signaling format configured for PDCCH ordered timing advance or mobility procedure, or a combination thereof.

6. The apparatus of claim 2, wherein the at least one processor is further configured to:

receive, from the source node, a configuration for at least one of the active DL BWP, the default DL BWP, the BWP inactivity timer, the first expiration time of the BWP inactivity timer, the mobility reception timer, the second expiration time of the mobility reception timer, one or more measurement objects, a first transmission and resource allocation scheme for measurement reporting, a first number of monitoring occasions for a search space set and a DL control signaling format before the mobility reception timer starts, a second number of monitoring occasions for the search space set and the DL control signaling format after the mobility reception timer starts, a scrambling sequence for DL control signaling or the mobility information, an identifier for the UE or a UE group including the UE, a second transmission and resource allocation scheme for UE assistance information, the first signal quality threshold of the source node, or the second signal quality threshold of the target node.

7. The apparatus of claim 1, wherein to start the mobility reception timer, the at least one processor is configured to start the mobility reception timer before the BWP inactivity timer expires at the first expiration time based at least on determining a time duration between a time of reporting the measurement and the first expiration time of the BWP inactivity timer is lower than a pre-configured threshold for the mobility reception timer, wherein the BWP inactivity timer is associated with a first time window configuration for the UE to receive control and data information that is unicast or multicast to the UE, and the time window to receive the mobility information is associated with a second time window configuration, and wherein stopping, pausing, or restarting the BWP inactivity timer in response to the start of the mobility reception timer comprising restarting the BWP inactivity timer;

wherein the at least one processor is further configured to:

switch, from a first beam, a first transmission reception point (TRP), or a first cell in the source node, to a second beam, a second TRP, or a second cell in the target node associated with the UE, based on receiving the mobility information from the source node and prior to reaching a greater or a lesser of the adjusted first expiration time of the BWP inactivity timer and a second expiration time of the mobility reception timer, or switch from the active DL BWP of the source node to the default DL BWP of the source node that is associated with the UE based on reaching the second expiration time associated with the greater or the lesser of the adjusted first expiration time of the BWP inactivity timer and the second expiration time of the mobility reception timer, and without receiving the mobility information from the source node.

8. The apparatus of claim 7, wherein the at least one processor is further configured to:

monitor at least one search space set in the active DL BWP of the UE for DL control signaling associated with the mobility information received from the source node while at least one of the BWP inactivity timer or the mobility reception timer is active.

9. The apparatus of claim 8, wherein to monitor the at least one search space set for the DL control signaling received from the source node for the mobility information, the at least one processor is configured to reduce a number of monitoring occasions for the DL control signaling subsequent to starting the mobility reception timer, based at least on a pre-configured rule, a reduction configuration from the source node, UE assistance information for power saving, or a hybrid thereof.

10. The apparatus of claim 7, wherein the adjusted first expiration time is an integer multiple, or a portion of the first expiration time.

11. The apparatus of claim 7, wherein the at least one processor is further configured to:
receive, from the source node, a configuration for at least one of the active DL BWP, the default DL BWP, the BWP inactivity timer, the first expiration time, the mobility reception timer, the second expiration time, one or more measurement objects, a reporting resource, the first signal quality threshold, the second signal quality threshold, or the adjusted first expiration time.

12. An apparatus for wireless communication at a source node, comprising:
a memory; and
at least one processor coupled to the memory and, based at least in part on information stored in the memory, the at least one processor is configured to:
configure, for a user equipment (UE), a first configuration for an active downlink (DL) bandwidth part (BWP) at the UE, a second configuration for a default DL BWP at the UE, a BWP inactivity timer, and a mobility reception timer, wherein the BWP inactivity timer and the mobility reception timer are configured with a triggering condition associated with the measurement, and wherein the BWP inactivity timer is configured to be stopped, paused, or restarted in response to the start of the mobility reception timer;
receive, from the UE, a measurement of at least one of the source node or a target node, wherein the measurement corresponds to the UE operating on the active DL BWP in the source node; and
provide, for the UE via DL signaling and based on the measurement of at least one of the source node or the target node, mobility information that includes a handoff command associated with the target node, wherein the DL signaling corresponds to a slot during at least one of the BWP inactivity timer or the mobility reception timer.

13. The apparatus of claim 12, wherein the at least one processor is further configured to configure at least one of:
a first expiration time of the BWP inactivity timer,
an adjusted first expiration time of the BWP inactivity timer,
a second expiration time of the mobility reception timer,
one or more measurement objects,
a reporting resource,
a first signal quality threshold associated with the source node, or
a second signal quality threshold associated with the target node.

14. The apparatus of claim 13, wherein the first signal quality threshold associated with the source node and the second signal quality threshold associated with the target node each correspond to the triggering condition.

15. A method of wireless communications at a user equipment (UE), comprising:
operating on an active downlink (DL) bandwidth part (BWP) in a source node, wherein the active DL BWP is not a default DL BWP associated with the UE;
starting a BWP inactivity timer at the UE that triggers a BWP switch from an active DL BWP to the default DL BWP after the BWP inactivity timer expires at a first expiration time;
reporting a measurement of at least one of the source node or a target node;
starting a mobility reception timer based on a condition associated with at least one of a first measurement of the source node being below a first signal quality threshold or a second measurement of the target node being above a second signal quality threshold, wherein the mobility reception timer is associated with a time window to receive mobility information for the UE on the active DL BWP; and
stopping, pausing, or restarting the BWP inactivity timer in response to the start of the mobility reception timer.

16. The method of claim 15, wherein stopping, pausing, or restarting the BWP inactivity timer in response to the start of the mobility reception timer comprising stopping or pausing the BWP inactivity timer, the method further comprising:
switching, from a first beam, a first transmission reception point (TRP), or first a cell in the source node, to a second beam, a second TRP, or a second cell in the target node of the UE based on receiving mobility information from the source node prior to reaching a second expiration time associated with the mobility reception timer, or
switching from the active DL BWP in the source node to the default DL BWP in the source node that is associated with the UE based on reaching the second expiration time of the mobility reception timer and without receiving the mobility information from the source node.

17. The method of claim 16, further comprising:
monitoring at least one search space set in the active DL BWP of the UE for DL control signaling associated with the mobility information received from the source node, while the mobility reception timer is active.

18. The method of claim 17, wherein monitoring at least one search space set of DL control signaling received from the source node for the mobility information includes reducing a number of monitoring occasions for the DL control signaling subsequent to starting the mobility reception timer, based at least on a pre-configured rule, a reduction configuration from the source node, UE assistance information for power saving, or a hybrid thereof.

19. The method of claim 17, wherein the at least one search space set associated with mobility information reception includes one or more of a common search space (CSS) set or a UE-specific search space (USS) set configuration, an identifier for the UE or a UE group including the UE, a DL control signaling format configured for PDCCH ordered timing advance or mobility procedure, or a combination thereof.

20. The method of claim 16, further comprising:
receiving, from the source node, a configuration for at least one of the active DL BWP, the default DL BWP, the BWP inactivity timer, the first expiration time of the BWP inactivity timer, the mobility reception timer, the second expiration time of the mobility reception timer, one or more measurement objects, a first transmission and resource allocation scheme for measurement reporting, a first number of monitoring occasions for a search space set and a DL control signaling format before the mobility reception timer starts, a second number of monitoring occasions for the search space set and the DL control signaling format after the mobility reception timer starts, a scrambling sequence for DL control signaling or the mobility information, an identifier for the UE or a UE group including the UE, a second transmission and resource allocation scheme for UE assistance information, the first signal quality threshold of the source node, or the second signal quality threshold of the target node.

21. The method of claim 15, wherein starting the mobility reception timer includes starting the mobility reception timer before the BWP inactivity timer expires at the first expiration time based at least on determining a time duration between a time of reporting the measurement and the first expiration time of the BWP inactivity timer is lower than a pre-configured threshold for the mobility reception timer, wherein the BWP inactivity timer is associated with a first time window configuration for the UE to receive control and data information that is unicast or multicast to the UE, and the time window to receive the mobility information is associated with a second time window configuration, and wherein stopping, pausing, or restarting the BWP inactivity timer in response to the start of the mobility reception timer comprising restarting the BWP inactivity timer;

the method further comprising:
switching, from a first beam, a first transmission reception point (TRP), or a first cell in the source node, to a second beam, a second TRP, or a second cell in the target node associated with the UE, based on receiving the mobility information from the source node and prior to reaching a greater or a lesser of the adjusted first expiration time of the BWP inactivity timer and a second expiration time of the mobility reception timer, or switching from the active DL BWP of the source node to the default DL BWP of the source node that is associated with the UE based on reaching the second expiration time associated with the greater or the lesser of the adjusted first expiration time of the BWP inactivity timer and the second expiration time of the mobility reception timer, and without receiving the mobility information from the source node.

22. The method of claim 21, further comprising:
monitoring at least one search space set in the active DL BWP of the UE for DL control signaling associated with the mobility information received from the source node while at least one of the BWP inactivity timer or the mobility reception timer is active.

23. The method of claim 22, wherein monitoring the at least one search space set for the DL control signaling received from the source node for the mobility information includes reducing a number of monitoring occasions for the DL control signaling subsequent to starting the mobility reception timer, based at least on a pre-configured rule, a reduction configuration from the source node, UE assistance information for power saving, or a hybrid thereof.

24. The method of claim 21, wherein the adjusted first expiration time is an integer multiple, or a portion of the first expiration time.

25. The method of claim 21, further comprising:
receiving, from the source node, a configuration for at least one of the active DL BWP, the default DL BWP, the BWP inactivity timer, the first expiration time, the mobility reception timer, the second expiration time, one or more measurement objects, a reporting resource, the first signal quality threshold, the second signal quality threshold, or the adjusted first expiration time.

26. A method of wireless communication at a source node, comprising:
configuring, for a user equipment (UE), a first configuration for an active downlink (DL) bandwidth part (BWP) at the UE, a second configuration for a default DL BWP at the UE, a BWP inactivity timer, and a mobility reception timer, wherein the BWP inactivity timer and the mobility reception timer are configured with a triggering condition associated with the measurement, and wherein the BWP inactivity timer is configured to be stopped, paused, or restarted in response to the start of the mobility reception timer; and receiving, from the UE, a measurement of at least one of the source node or a target node, wherein the measurement corresponds to the UE operating on the active DL BWP in the source node; and providing, for the UE via DL signaling and based on the measurement of at least one of the source node or the target node, mobility information that includes a handoff command associated with the target node, wherein the DL signaling corresponds to a slot during at least one of the BWP inactivity timer or the mobility reception timer.

27. The method of claim 26, further comprising configuring at least one of:
a first expiration time of the BWP inactivity timer,
an adjusted first expiration time of the BWP inactivity timer,
a second expiration time of the mobility reception timer,
one or more measurement objects,
a reporting resource,
a first signal quality threshold associated with the source node, or
a second signal quality threshold associated with the target node.

28. The method of claim 27, wherein the first signal quality threshold associated with the source node and the second signal quality threshold associated with the target node each correspond to the triggering condition.

* * * * *